United States Patent [19]
Uzawa

[11] Patent Number: 5,648,835
[45] Date of Patent: Jul. 15, 1997

[54] OPTICAL SYSTEM FOR MONITOR CAMERAS TO BE MOUNTED ON VEHICLES

[75] Inventor: Tsutomu Uzawa, Saitama-ken, Japan

[73] Assignee: Olympus Optical Co., Ltd., Tokyo-to, Japan

[21] Appl. No.: 418,456

[22] Filed: Apr. 7, 1995

Related U.S. Application Data

[62] Division of Ser. No. 124,592, Sep. 21, 1993, Pat. No. 5,448,319.

[30] Foreign Application Priority Data

Sep. 22, 1992 [JP] Japan .................................. 4-252520
Oct. 30, 1992 [JP] Japan .................................. 4-314445

[51] Int. Cl.⁶ ........................ G03B 29/00; G02B 17/00
[52] U.S. Cl. ........................ 396/429; 359/366; 396/419
[58] Field of Search .............................. 354/75, 76, 79, 354/80, 81; 359/549, 362, 366

[56] References Cited

U.S. PATENT DOCUMENTS

| | | | |
|---|---|---|---|
| 3,634,622 | 1/1972 | Wheeler | 354/81 |
| 3,790,248 | 2/1974 | Kellow | 350/10 |
| 4,093,364 | 6/1978 | Miller | 354/81 |
| 4,420,238 | 12/1983 | Felix | 354/81 |
| 4,968,124 | 11/1990 | Deckert et al. | 350/574 |
| 4,993,819 | 2/1991 | Moorhouse | 350/557 |
| 5,121,200 | 6/1992 | Choi | 354/81 |
| 5,204,489 | 4/1993 | Pellarin et al. | 359/403 |
| 5,239,411 | 8/1993 | Espie et al. | 359/362 |
| 5,247,319 | 9/1993 | Hahn | 354/75 |
| 5,260,731 | 11/1993 | Baker, Jr. | 354/81 |
| 5,502,596 | 3/1996 | Suzuki | 359/657 |

FOREIGN PATENT DOCUMENTS

| | | |
|---|---|---|
| 51-62053 | 5/1976 | Japan . |
| 57-33045 | 2/1982 | Japan . |
| 60-119179 | 8/1985 | Japan . |
| 1265216 | 10/1989 | Japan . |
| 2-26958 | 2/1990 | Japan . |

Primary Examiner—Safet Metjahic
Assistant Examiner—Nicholas J. Tuccillo
Attorney, Agent, or Firm—Cushman, Darby & Cushman IP Group of Pillsbury Madison & Sutro LLP

[57] ABSTRACT

An optical system for monitor cameras to be mounted on vehicles comprising a camera body disposed so as to be accommodatable into a support erected on a vehicle, a photographic lens system disposed in the camera body, an image pickup device having a light receiving surface which is disposed at an imaging location of the photographic lens system and directed perpendicularly to a longitudinal direction of the support, and a prism for changing a direction toward a visual field which functions to image a visual field in a horizontal direction onto the light receiving surface of the image pickup device.

3 Claims, 18 Drawing Sheets

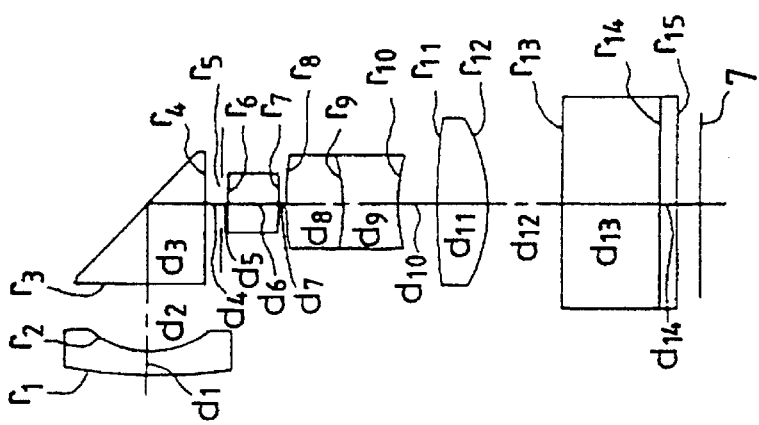
FIG. 7
FIG. 6
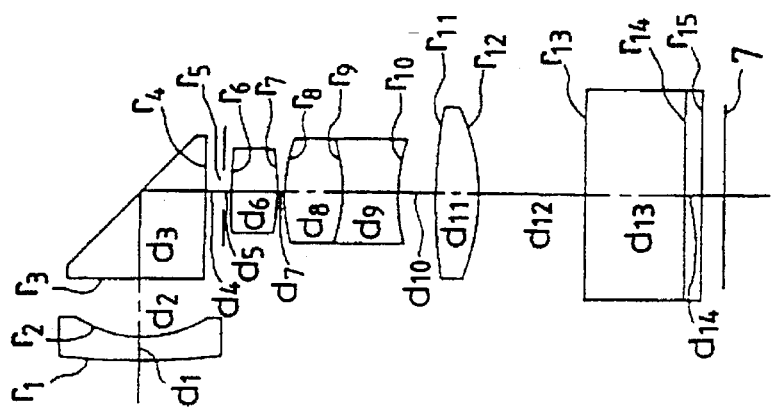
FIG. 5
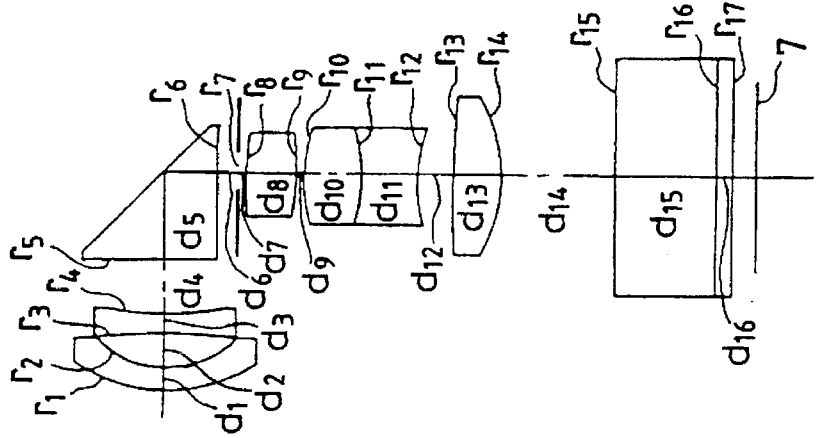

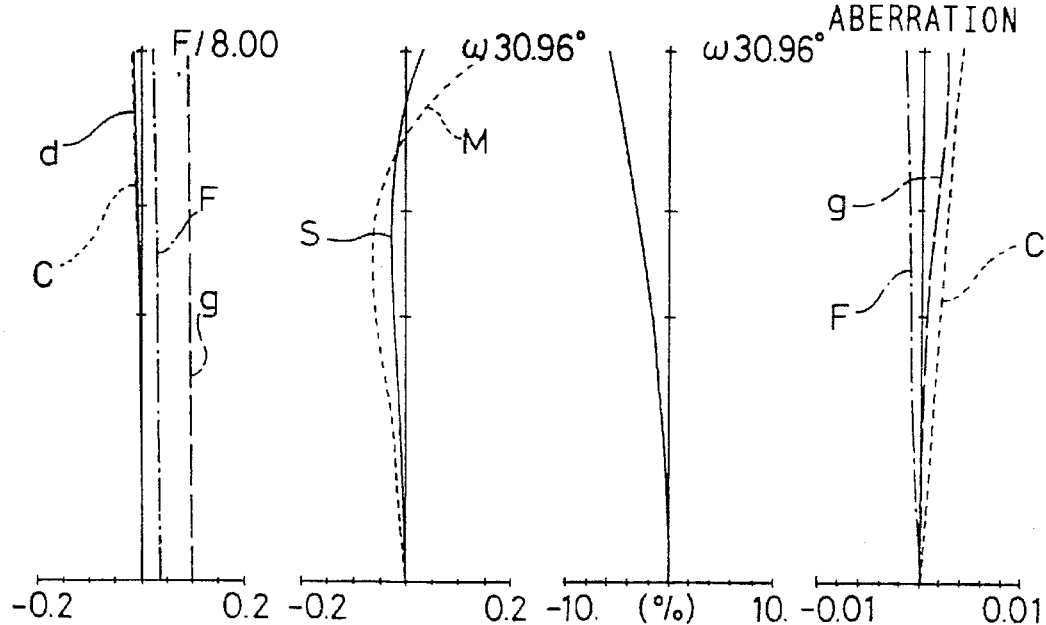
FIG. 19A SPHERICAL ABERRATION
FIG. 19B ASTIGMATISM
FIG. 19C DISTORTION
FIG. 19D LATERAL CHROMATIC ABERRATION
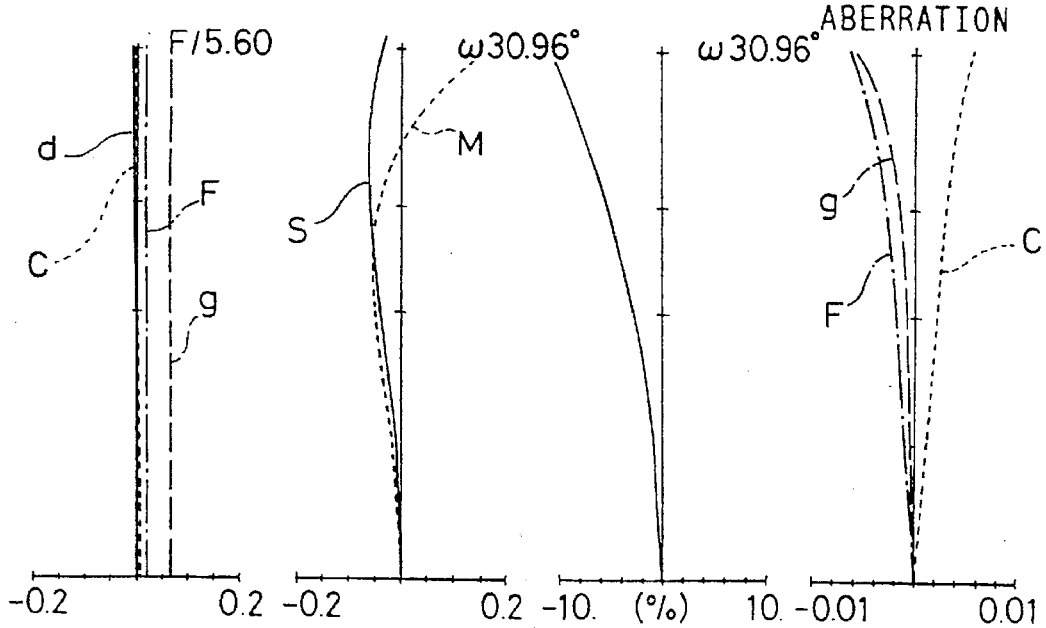
FIG. 20A SPHERICAL ABERRATION
FIG. 20B ASTIGMATISM
FIG. 20C DISTORTION
FIG. 20D LATERAL CHROMATIC ABERRATION

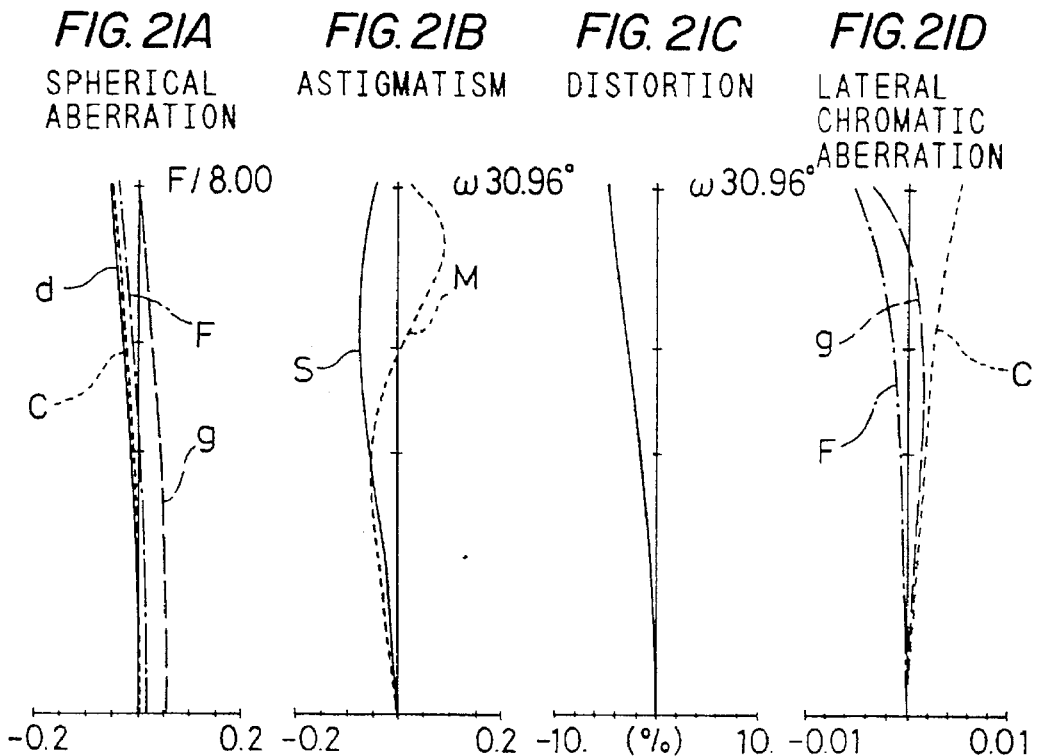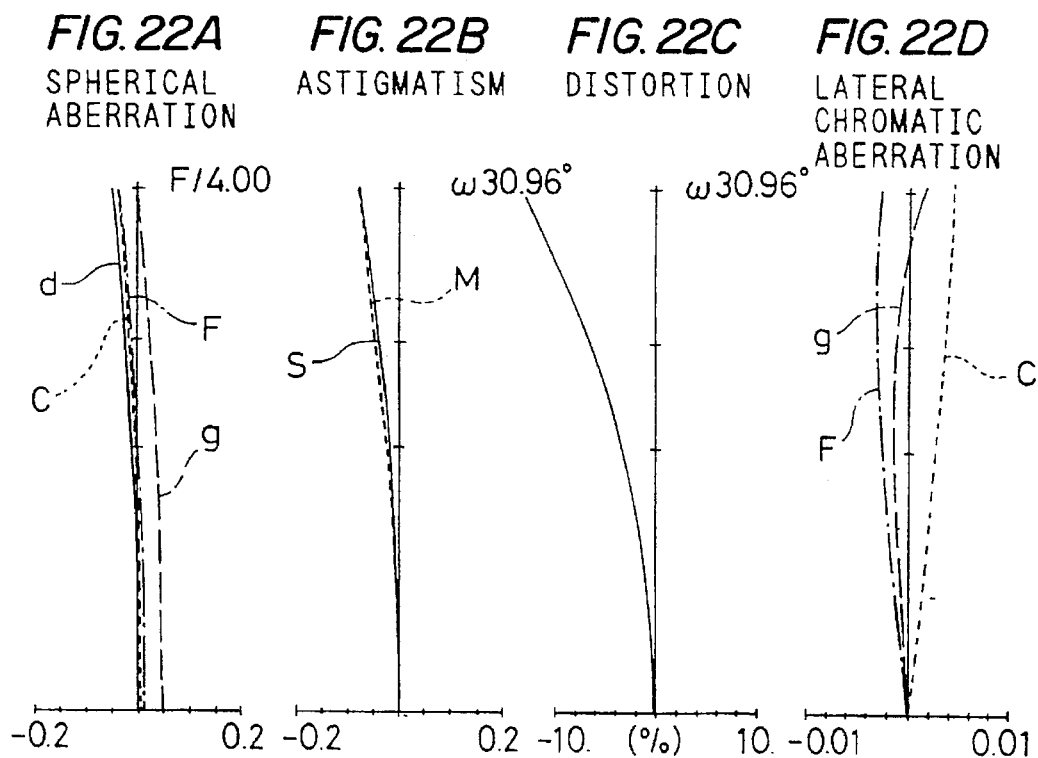

SPHERICAL ABERRATION

ASTIGMATISM

DISTORTION

LATERAL CHROMATIC ABERRATION

SPHERICAL ABERRATION

ASTIGMATISM

DISTORTION

LATERAL CHROMATIC ABERRATION

FIG. 25A
SPHERICAL ABERRATION
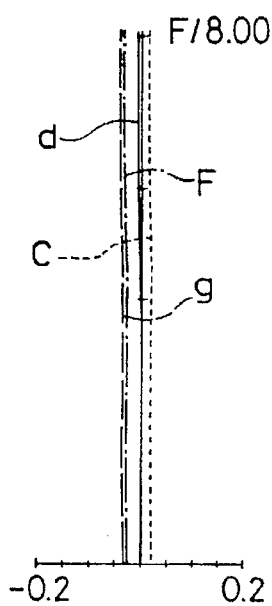
FIG. 25B
ASTIGMATISM
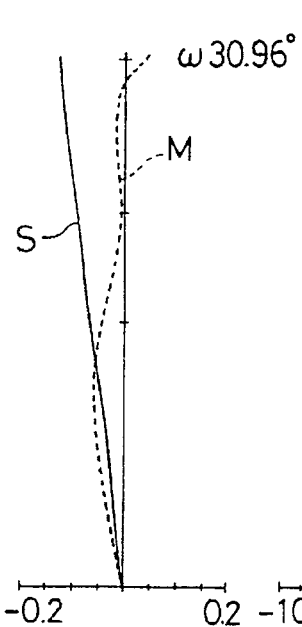
FIG. 25C
DISTORTION
FIG. 25D
LATERAL CHROMATIC ABERRATION
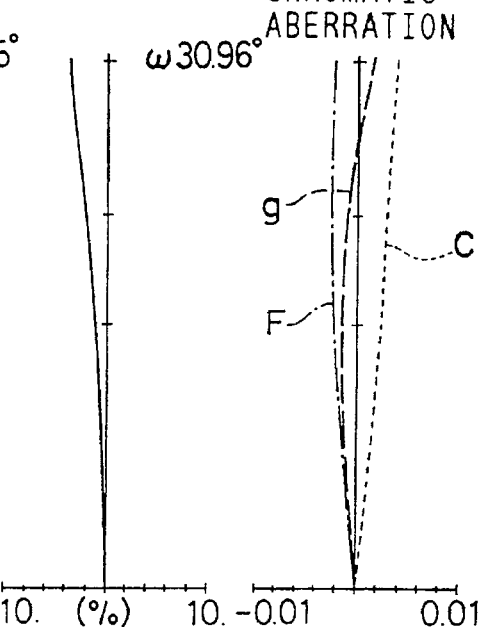
FIG. 26A
SPHERICAL ABERRATION
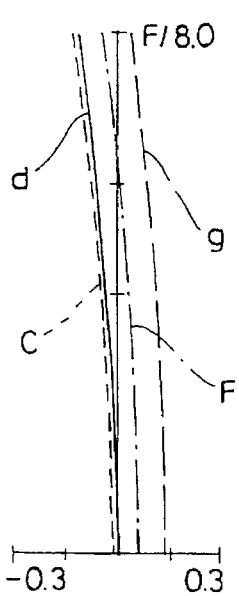
FIG. 26B
ASTIGMATISM
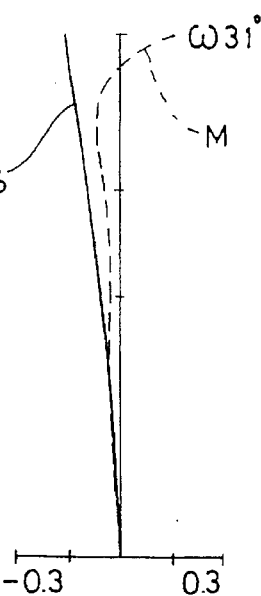
FIG. 26C
DISTORTION
FIG. 26D
LATERAL CHROMATIC ABERRATION
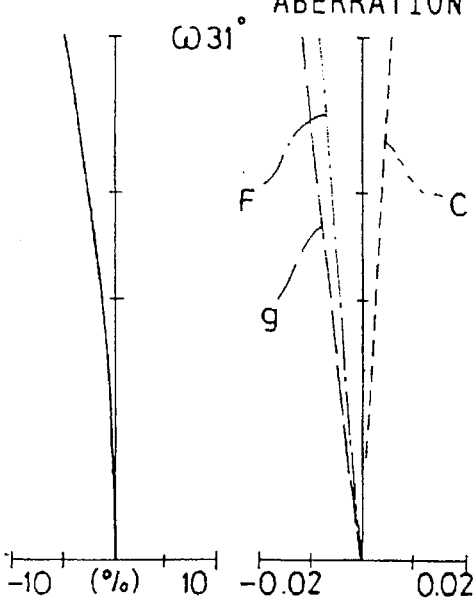

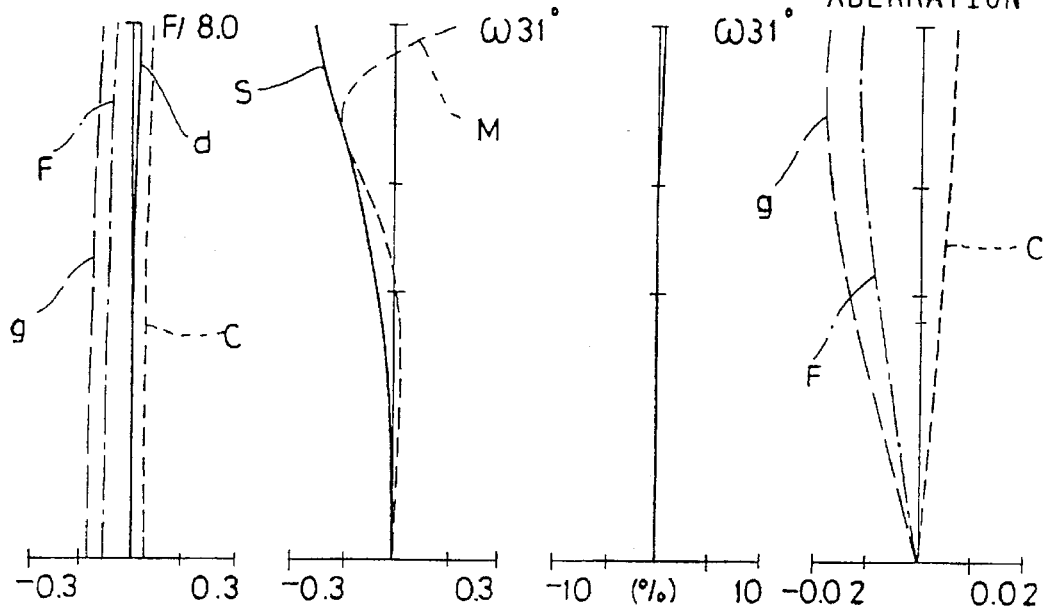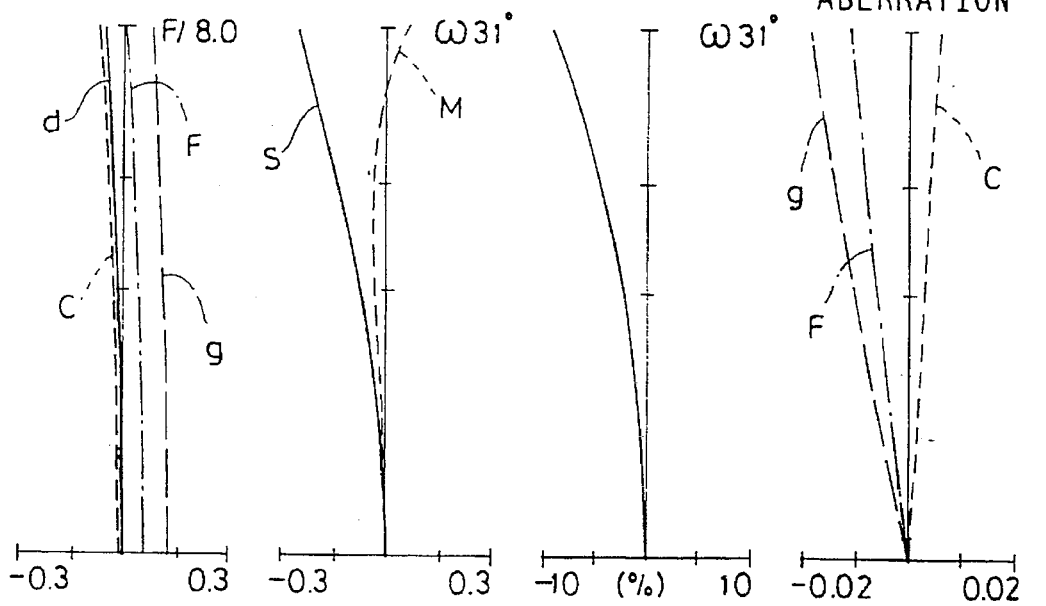

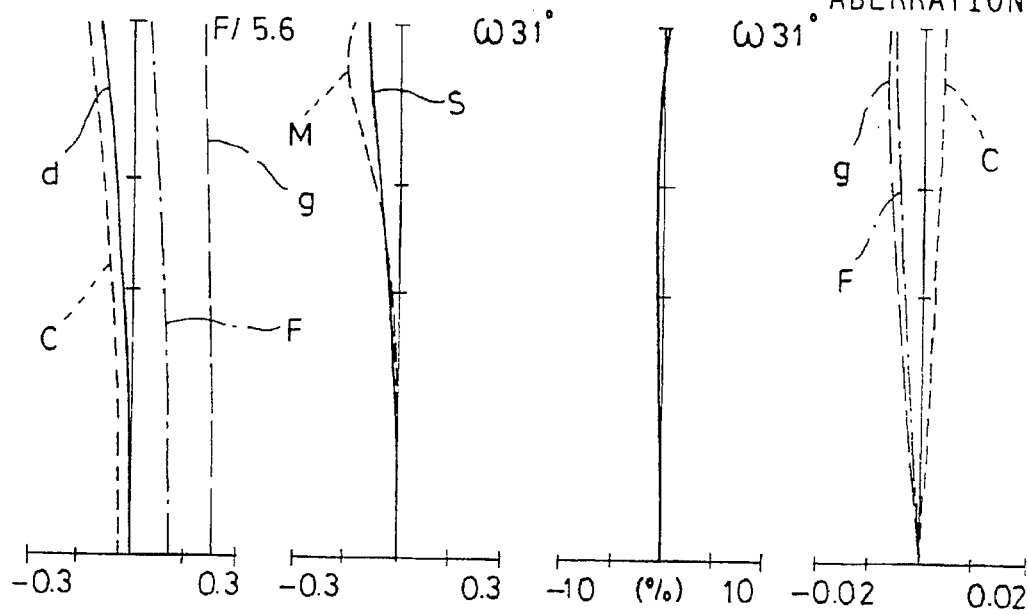
FIG. 29A SPHERICAL ABERRATION
FIG. 29B ASTIGMATISM
FIG. 29C DISTORTION
FIG. 29D LATERAL CHROMATIC ABERRATION
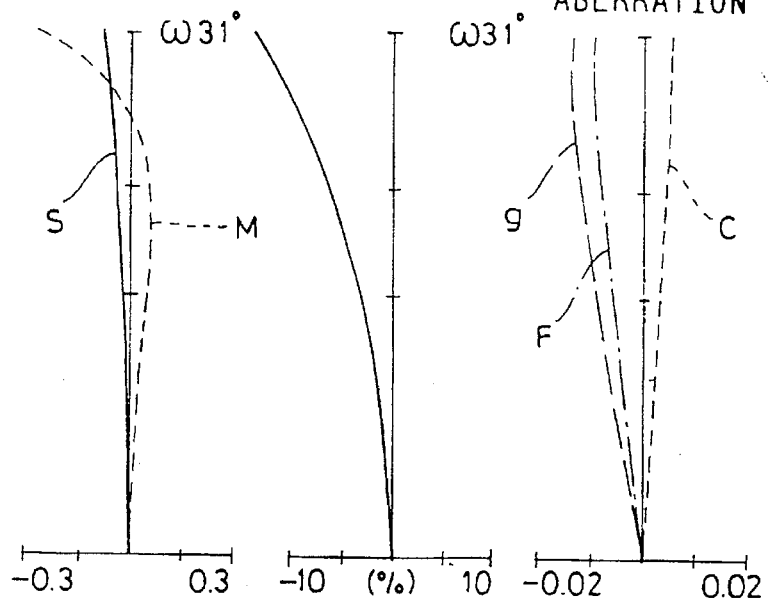
FIG. 30A SPHERICAL ABERRATION
FIG. 30B ASTIGMATISM
FIG. 30C DISTORTION
FIG. 30D LATERAL CHROMATIC ABERRATION

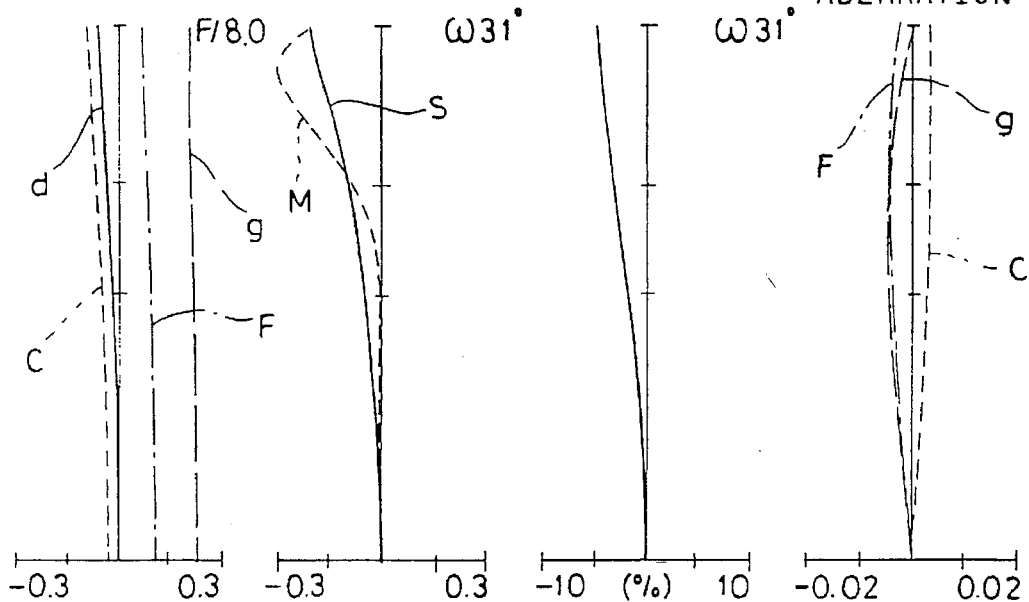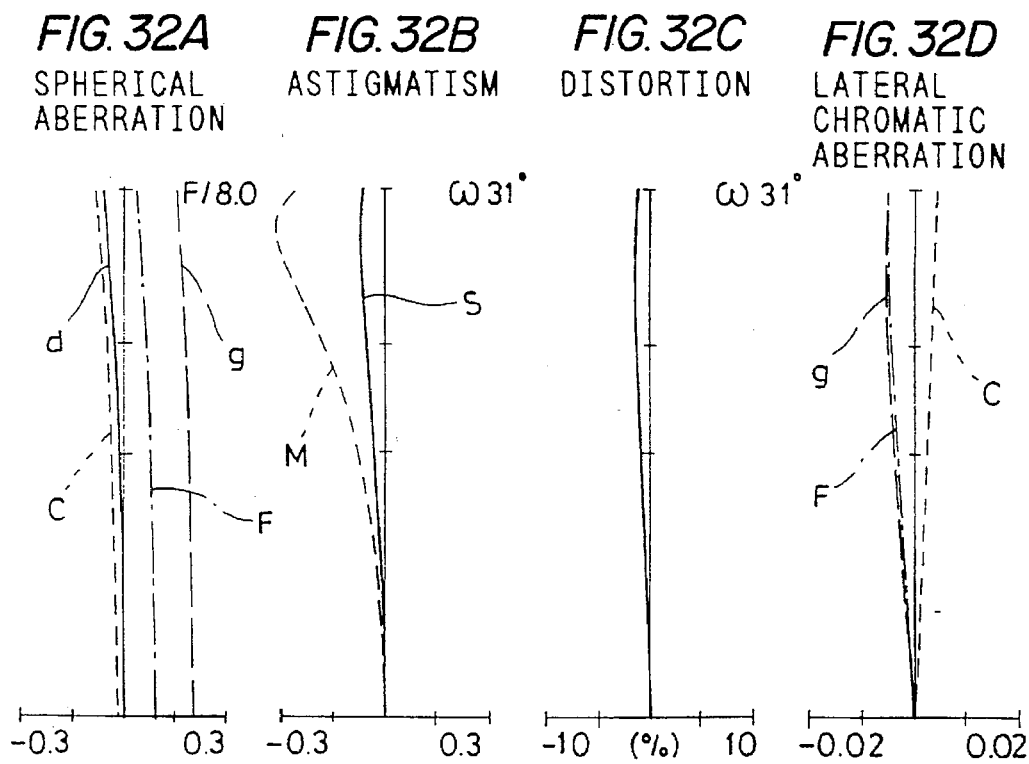

OPTICAL SYSTEM FOR MONITOR CAMERAS TO BE MOUNTED ON VEHICLES

This is a division of application Ser. No. 08/124,592, filed Sep. 21, 1993 now U.S. Pat. No. 5,448,319.

BACKGROUND OF THE INVENTION a) Field of the invention:

The present invention relates to an optical system for monitor cameras to be mounted on vehicles, and more specifically to an optical system for monitor cameras which are to be mounted on vehicles for detecting the presence of obstacles located within ranges of visual fields at dead angles.

b) Description of the prior art:

In the field of sideway monitors for vehicles, there is known, for example, a monitor disclosed by Japanese Patent Kokai Publication No. Sho 57-33,045. This monitor comprises a camera body which is mounted on a bonnet of a vehicles so as to be freely rotatable for permitting detection of securities on the right and left sides of the vehicle in cases, for example, where the vehicle is to run into a road from a place at which a driver cannot have good visibilities on the right and left side of the vehicle.

However, the monitor disclosed by the Japanese Patent Kokai Publication No. Sho 57-33,045 has a section which is relatively long as measured from the camera body to a driver's seat and provides narrow visual fields, thereby permitting confirmation of securities within narrow visual fields.

In the field of monitors for detecting securities within ranges at the back of vehicles, there is known a monitor which is disclosed by Japanese Utility Model Kokai Publication No. Sho 60-119,179. This monitor is configured so as to permit monitoring securities by using a monitor TV which is equipped with the TV camera disposed in the vicinity of a driver's seat.

In the case of the sideway monitor for vehicles, obstacles which are present near road surfaces often hinder confirmation of securities. Accordingly, it has been proposed to dispose a monitor camera, such as a video camera at a location which is higher to a certain degree than the road surfaces as schematically illustrated in FIG. 1. The sideway monitor shown in FIG. 1 uses a video camera 3 which is mounted on a support 2 erected on a portion of a vehicle body 1.

However, this sideway monitor is problematic in that it is disadvantageous for accommodation while it is unused and in that it is rather fragile against external impact.

SUMMARY OF THE INVENTION

A primary object of the present invention is to provide an optical system for monitor cameras to be mounted on vehicles which can be configured compactly and which is less subject to external impact.

Another object of the present invention is to provide an optical system which comprises a compact photographic lens system and is to be disposed in a monitor camera which in turn is to be mounted on vehicle, and has aberrations favorably corrected.

The optical system for monitor cameras to be mounted on vehicles such as automobiles (hereinafter referred to as the optical system for automobile-mounted monitor cameras) according to the present invention is an optical system for monitor cameras which are disposed, for example, over front portions of automobile bodies and the like, and is characterized in that it comprises an optical means for changing a direction toward a visual field which functions to deflect rays coming from the visual field so as to form a visual field in a nearly horizontal direction on a light receiving surface of an image pickup device which faces nearly upward or is set in nearly the same direction as that of a road surface.

FIG. 3 is a vertical sectional view illustrating a concept of the optical system for automobile-mounted monitor cameras according to the present invention. As illustrated in FIG. 3, rays coming from an object located on a road surface are incident from the object side onto a photographic lens system 4 of a camera body 20 which is set in a nearly horizontal direction, directed downward by an optical member 5 such as a prism which is disposed in the photographic lens system 4 for changing a direction toward the visual field and lead to a light receiving surface 7 of an image pickup device 6 facing nearly upward.

When a video camera is mounted on a top end of a support 8 erected on a front portion or a rear portion of an automobile body 9, a light receiving device such as an image pickup device 6 is disposed in a direction which is the same as a longitudinal direction of the support 8 (perpendicular to the road surface) and the light receiving device only slightly protrudes in a direction perpendicular to the longitudinal direction of the support 8 (a direction in parallel with the road surface), whereby the optical system according to the present invention can easily be accommodated while it is not in use. In addition, this construction is relatively compact. Further, owing to the fact that the optical system according to the present invention has nearly no protrusion, it can be accommodated into the support 8 and have a form which will hardly be subjected to external impact.

The optical system according to the present invention can be configured so as to permit changing the direction toward the visual field from a horizontal direction to a vertical direction.

In other words, the direction toward the visual field is changed not necessarily by 90° (normal to the light receiving surface 7 of the image pickup device 6 is perpendicular to the road surface) and may be approximately 90°. When a center of the visual field is directed a little lower than the horizontal direction, for example, the optical system according to the present invention permits monitoring a broader range in the direction toward the road surface while avoiding directions toward the sky in which monitoring is hardly required. For monitoring the broader range of the road surface as described above, the optical member 5 for changing the direction toward the visual field is configured so as to be movable so that the direction toward the visual field can be changed as desired by changing an angle of a reflecting surface of the optical member 5. In this case, a portion of the photographic lens system 4 which is disposed on the object side of the optical member 5 for changing the direction toward the visual field is to be configured so as to be movable together with the optical member 5 for changing the direction toward the visual field.

When the optical member 5 for changing the direction toward the visual field is disposed on the object side of the photographic lens system 4, it is sufficient to configure only the optical member 5 for changing the direction toward the visual field so as to be movable for the purpose described above, thereby making it possible to simplify a driving system for the optical member for changing the direction toward the visual field and reducing electrical power to be consumed in driving the optical member.

Further, it is desirable that a stop which has a fixed diameter is constructed integrally with a lens barrel.

Unlike portable cameras which are used for the ordinary photography, the automobile-mounted cameras are apt to allow lens elements disposed in lens barrels thereof to be displaced relative degradation of to one another due to vibrations of automobile bodies and resultant imaging performance of the cameras. In cases where movable members such as stops are disposed in the lens barrels, in particular, the lens barrels having complicated structures, the lens barrels are apt to be more fragile against the vibrations, and problems are posed more frequently by the relative positional displacements of the lens elements. The relative positional displacements of the lens elements caused due to the vibrations of the automobile bodies can be prevented by structuring the stops having the fixed diameters integrally with the lens barrels. When the stops have the fixed diameters, brightness of images can be controlled by using, for example, electronic shutters.

Furthermore, it is desirable for the photographic lens system of the optical system for automobile-mounted cameras according to the present invention to have a fixed focal point so that an object existing at nearly infinite distance is located with depth of field of the lens system.

The optical system for automobile-mounted cameras according to the present invention is to be used mostly for observing objects existing at for distances. Accordingly, it is possible to simplify a structure of a lens barrel for the optical system when a focal length of the photographic lens system is set so as to locate an object existing at nearly infinite distance within the depth of field of the photographic lens system, i.e., when a rear focal point of the photographic lens system is set on the light receiving surface 7 of the image pickup device 6 and the optical system is configured so as to be immovable. Further, it is also desirable that the photographic lens system has an F number larger than 2.8. When the photographic lens system has a fixed focal length and an F number larger than 2.8, the optical system for automobile-mounted cameras according to the present invention can have a long depth of field, thereby permitting detection of obstacles located within a broad range from a far distance to an automobile which is equipped with the optical system while keeping the obstacles in focus at the same time.

A photographic lens system which is to be used in the optical system for automobile-mounted cameras according to the present invention comprises, in order from the object side, a front lens unit using at least one lens component having a negative refractive power and a rear lens unit using a single lens component or a plurality of lens components including a lens component having a positive refractive power, and satisfies the following condition (1):

$$0.6 < f/D < 1.2 \tag{1}$$

wherein the reference symbol f represents a focal
length of the photographic lens system and the reference symbol D designates a diagonal length of a
picture plane of the image pickup device.

The condition (1) mentioned above is required for obtaining an adequate range of visual field and stable images. If the lower limit of the condition (1) is exceeded, the optical system will have too broad a visual field and low imaging magnification for objects, whereby discriminating capability of the optical system will be degraded. If the upper limit of the condition (1) is exceeded, in contrast, the optical system will have a narrow visual field and undesirably allow images to be vibrated due to vibrations of the automobile which is equipped with the optical system for monitor cameras.

Further, it is desirable to use one aspherical surface or a plurality of aspherical surfaces for correcting distortion in the optical system for automobile-mounted monitor cameras according to the present invention.

It is desirable for confirmation of security within a visual field that the visual field is free from distortion. However, optical systems for cameras which are to be used for monitoring within broad visual fields tend to produce remarkable negative distortion. In case of the optical system for automobile-mounted monitor cameras according to the present invention, it is possible to obtain visual fields within which distortion is corrected by using a single aspherical surface or a plurality of aspherical surfaces. More concretely, distortion within the visual fields of the optical system for automobile-mounted monitor cameras according to the present invention can be corrected by configuring a lens component to be disposed on the object side of a stop so as to have an aspherical surface which has a negative refractive power weakened as portions of the aspherical surface are farther from a center of the lens component or configuring a lens component to be disposed on the image side of the stop so as to have an aspherical surface which has a positive refractive power weakened as portions of the aspherical surface are farther from a center of the lens component.

Since the optical system for automobile-mounted monitor cameras according to the present invention is to be used outdoors and frequently in the daytime, the photographic lens system of the optical system may have a large F number as already described above. Such a large F number is advantageous for reducing a number of lens elements to be disposed in the photographic lens system of the optical system according to the present invention.

In order to compose the photographic lens system of the optical system according to the present invention of a possible smallest number of lens elements, the photographic lens system can be composed of a front lens unit consisting of a first lens component composed only of a single negative lens element and a rear lens unit consisting of a second lens component composed only of a single lens element. In order to correct lateral chromatic aberration favorably, however, it is necessary to compose the second lens component of two lens elements. In this case, it is desirable to compose the second lens component of a positive lens element and a negative lens element. Further, it is desirable, for favorable correction of aberrations, including chromatic aberration, to configure the photographic lens system so as to satisfy the following conditions (2) through (4):

$$v_1 > 40 \tag{2}$$

$$v_{2p} - v_{2n} > 10 \tag{3}$$

$$(n_{2n} - n_{2p}) \times \{2/(|r_{2n}| + |r_{2p}|)\} \times f > 0.48 \tag{4}$$

wherein the reference symbol $v_1$ represents an Abbe's number of the negative lens element of the first lens component, the reference symbols $v_{2p}$ and $v_{2n}$ designate Abbe's numbers of the positive lens element and the negative lens element (a biconvex lens element and a negative meniscus lens element) respectively of the second lens component, the reference symbols $n_{2p}$ and $n_{2n}$ denote refractive indices of the positive lens element and the negative lens element respectively of the second lens component, the reference symbols $r_{2p}$ and $r_{2n}$ represent radii of curvature on surfaces of the positive lens element and the negative lens element respectively of the second lens component which are opposed to each other (a radius of curvature $r_{2p}=r_{2n}$ on a cemented surface in a case where the second lens component is configured as a cemented doublet), and the reference symbol f designates a focal length of the photographic lens system as a whole.

It is necessary, for a photographic lens system of an optical system for automobile-mounted cameras, to permit observing objects located within a broad range from a long distance which is on the order of infinite to a short distance close to the body of an automobile equipped with the camera in a condition where all the objects are brought into focus at the same time. It is therefore desirable for the photographic lens system to have a far depth of field. Further, ordinary monitor cameras are used mainly indoors and at relatively dark places in the night, whereas automobile-mounted monitor cameras are used outdoors and frequently in the daytime. Accordingly, photographic lens systems for optical systems for automobile-mounted monitor cameras may have large F numbers which are advantageous for reducing numbers of lens elements to be disposed in the photographic lens systems.

In case of the photographic lens system of the optical system according to the present invention which is of the type described above, the first lens component can be composed of a single negative lens element and the second lens component can be composed of a single positive lens element for minimizing the number of lens elements to be disposed in the photographic lens system as described above. In order to correct lateral chromatic aberration, however, an additional lens element must be used in the photographic lens system and it is most effective for this purpose to use a negative lens element additionally in the second lens component. Further, it is desirable that the photographic lens system satisfies the above-mentioned conditions (2), (3) and (4).

The conditions (2) and (3) are required for suppressing production of chromatic aberration in the lens components so as to favorably correct chromatic aberration in the photographic lens system as a whole.

If the condition (2) is not satisfied, lateral chromatic aberration will be undercorrected. If the range defined by the condition (3) is exceeded, both lateral chromatic aberration and longitudinal chromatic aberration will be undercorrected.

The condition (4) defines refractive powers of the surfaces of the positive lens element and the negative lens element which are opposed to each other in the second lens component. If the range defined by the condition (4) is exceeded, mainly spherical aberration and chromatic aberration will be undercorrected.

In addition, the second lens component may be composed, in order from the object side, of the negative lens element and the positive lens element or the positive lens element and the negative lens element.

It is more desirable that the first lens component and the second lens component to be used in the photographic lens system of the optical system according to the present invention satisfy the following conditions (5) and (6) respectively:

$$-4 < f_1/f < -0.95 \quad (5)$$
$$0.85 < f_2/f < 2 \quad (6)$$

wherein the reference symbols $f_1$ and $f_2$ represent a focal length of the first lens component and that of the second lens component respectively.

The conditions (5) and (6) are required for configuring the photographic lens system compacter and define refractive powers of the two lens components respectively. If the lower limit of the condition (5) or (6) is exceeded, a disadvantage will be produced for reserving a required back focal length of the photographic lens system, thereby making it difficult to reserve a space for disposing optical members such as filters. Further, the photographic lens system will tend to have large positive Petzval's sum. If the upper limit of the condition (5) or (6) is exceeded, in contrast, an advantage will be obtained for reserving the required back focal length of the photographic lens system but this lens system will be apt to have a long total length.

Moreover, it is desirable to use, on the first lens component, an aspherical surface which has a negative refractive power weakened as portions of the aspherical surface are farther from an optical axis thereof. Though distortion of images has conventionally been neglected in photographic lens systems of optical systems for automobile-mounted monitor cameras, it is desirable to correct distortion for more precise confirmation of securities within visual fields. For favorable correction of distortion, it is effective to use an aspherical surface such as that described above on the first lens component.

BRIEF DESCRIPTION OF THE DRAWINGS

FIG. 5 through FIG. 18 show sectional views illustrating compositions of a first embodiment through a fourteenth embodiment of the photographic lens system to be used in the optical system for automobile-mounted monitor cameras according to the present invention;

FIG. 19a through FIG. 32D show graphs illustrating aberration characteristics of the first through fourteenth embodiments of the present invention;

DETAILED DESCRIPTION OF THE PREFERRED EMBODIMENTS

Now, the optical system for automobile-mounted monitor cameras according to the present invention will be described is more detailed below with reference to the preferred embodiments thereof illustrated in the accompanying drawings.

Figure 1:
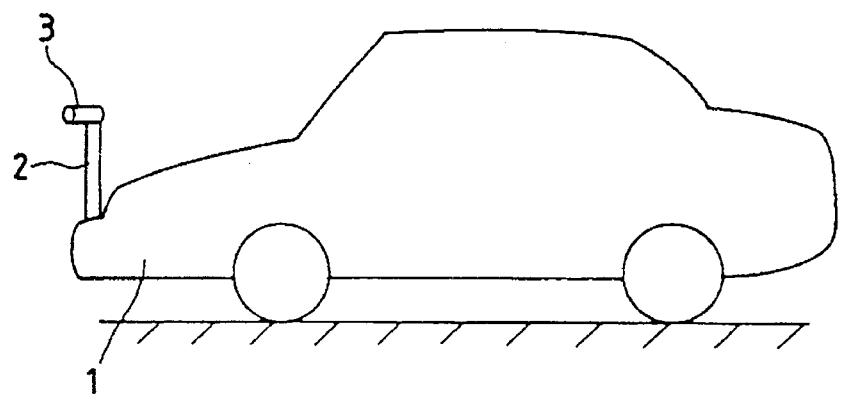
FIG. 1 shows a schematic diagram of an automobile on which the conventional monitor camera is mounted.
Figure 2:
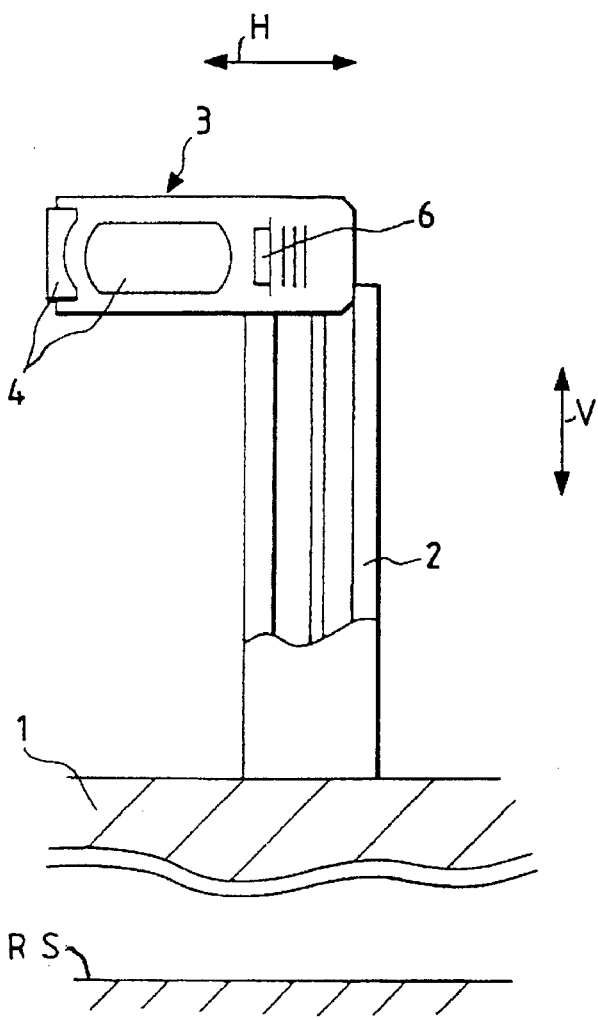
FIG. 2 shows a partial sectional view illustrating the conventional monitor camera.
Figure 3:
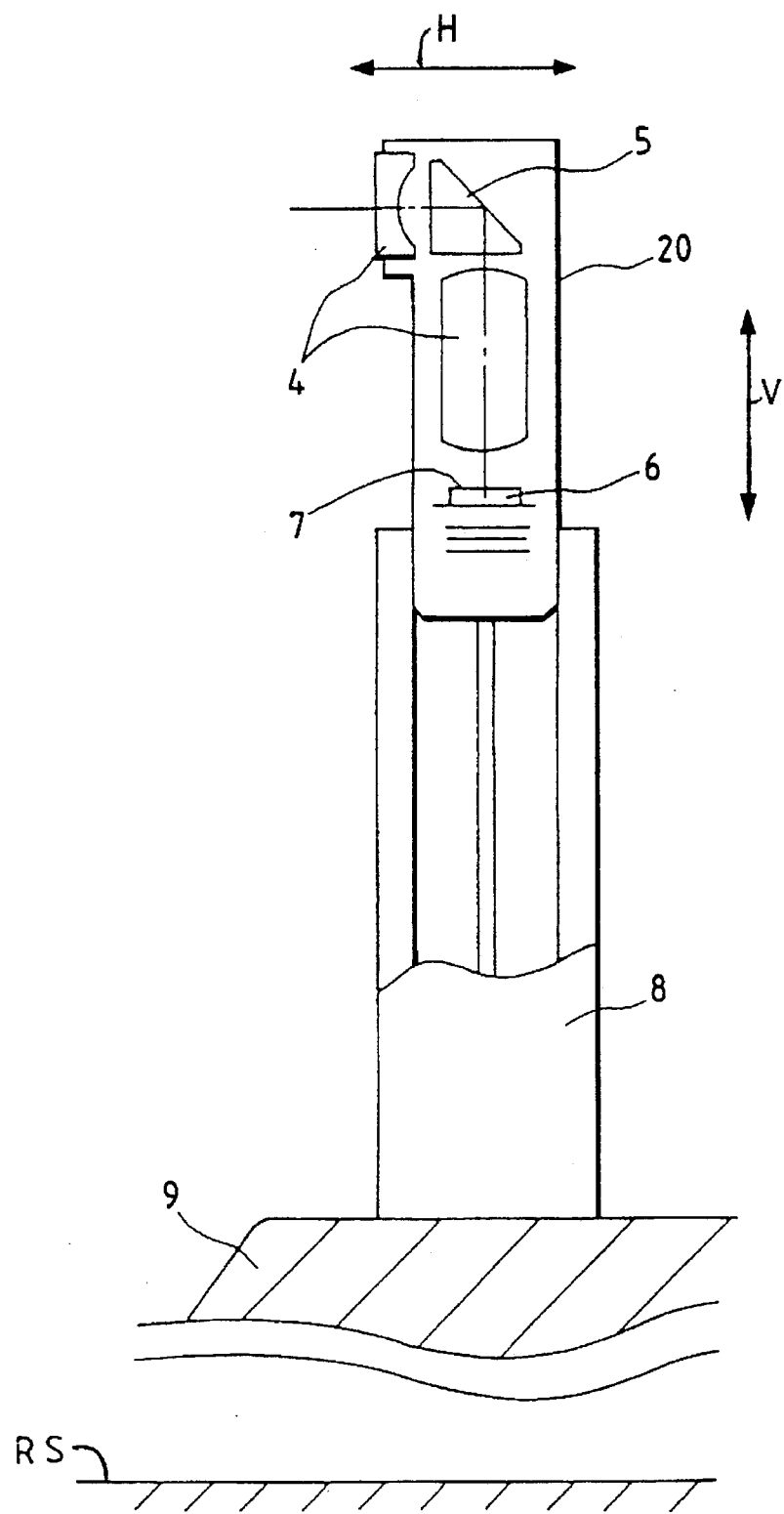
FIG. 3 shows a sectional view descriptive of the concept of the optical system for automobile-mounted monitor cameras according to the present invention.
Figure 4:
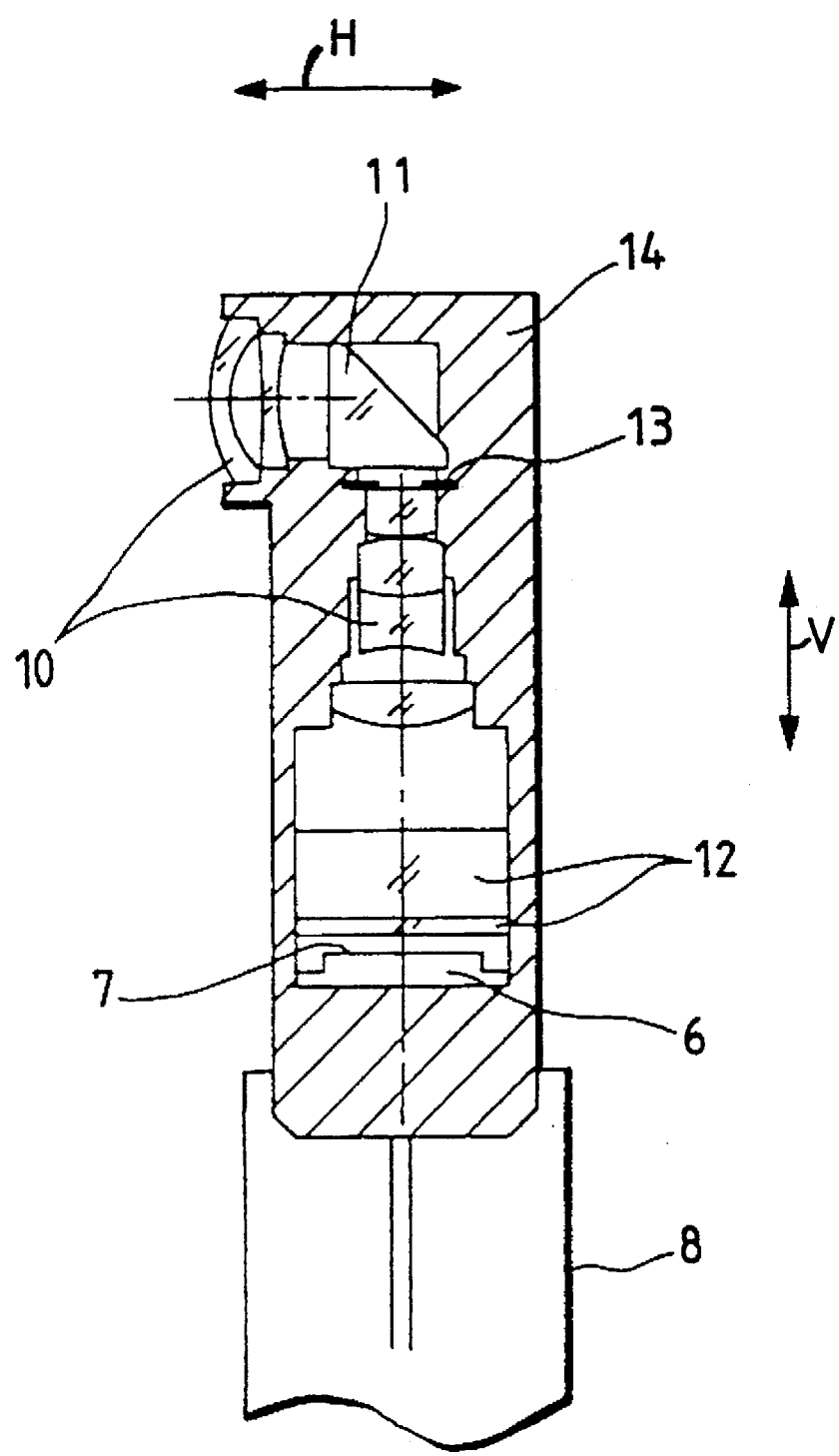
FIG. 4 shows a sectional view illustrating an embodiment of the optical system for automobile mounted monitor cameras according to the present invention.

FIG. 4 shows a sectional view illustrating an embodiment of the optical system for automobile-mounted monitor cameras according to the present invention. An image pickup device 6 is disposed so as to set a light receiving surface thereof 6 nearly upward or in nearly the same direction as that of a road surface (not shown). A roof prism 11 is disposed as a member for changing a direction toward a visual field in an optical path of a photographic lens system 10 so that the optical system permits monitoring objects located in a horizontal direction while changing the direction toward the visual field is changed 90°. Optical members such as an optical filter 12 are also disposed in the optical path of the photographic lens system 10. Disposed on the image side of the roof prism 11 is a stop 13 which has a fixed diameter and is structured integrally with a lens barrel 14.

Now, description will be made of the embodiments of the photographic lens system which is to be used in the optical system for automobile-mounted monitor cameras according to the present invention.

The first through fourteenth embodiments of the photographic lens system have compositions illustrated in FIG. 5 through FIG. 18 respectively, and numerical data listed below:

Embodiment 1

$f = 7$ mm, image height = 4.2 mm, $2\omega = 62°$, F/8, S = 1 mm
$r_1 = 7.6440$
  $d_1 = 1.0000$   $n_1 = 1.69680$   $\nu_1 = 55.52$
$r_2 = 4.2870$
  $d_2 = 1.5100$
$r_3 = -53.8420$
  $d_3 = 1.0000$   $n_2 = 1.69680$   $\nu_2 = 55.52$
$r_4 = 12.5580$
  $d_4 = 2.4000$
$r_5 = \infty$
  $d_5 = 6.7200$   $n_3 = 1.80610$   $\nu_3 = 40.95$
$r_6 = \infty$
  $d_6 = 1.0000$
$r_7 = \infty$ (stop)
  $d_7 = 0.0000$
$r_8 = 18.5990$
  $d_8 = 2.4700$   $n_4 = 1.68893$   $\nu_4 = 31.08$
$r_9 = -9.8120$
  $d_9 = 02000$
$r_{10} = 6.4610$
  $d_{10} = 2.8400$   $n_5 = 1.51633$   $\nu_5 = 64.15$
$r_{11} = -6.4610$
  $d_{11} = 2.5300$   $n_6 = 1.80518$   $\nu_6 = 25.43$
$r_{12} = 5.6790$
  $d_{12} = 1.7300$
$r_{13} = 58.8010$
  $d_{13} = 2.2200$   $n_7 = 1.69680$   $\nu_7 = 55.52$
$r_{14} = -7.1490$
  $d_{14} = 5.2080$
$r_{15} = \infty$
  $d_{15} = 4.5300$   $n_8 = 1.54771$   $\nu_8 = 62.83$
$r_{16} = \infty$
  $d_{16} = 0.8000$   $n_9 = 1.52420$   $\nu_9 = 70.20$
$r_{17} = \infty$
f/D = 0.83

Embodiment 2

$f = 7$ mm, image height = 4.2 mm, $2\omega = 62°$, F/5.6, S = 1 mm
$r_1 = 70.1908$
  $d_1 = 1.0000$   $n_1 = 1.69680$   $\nu_1 = 55.52$
$r_2 = 4.9513$
  $d_2 = 2.5481$
$r_3 = \infty$
  $d_3 = 6.7200$   $n_2 = 1.80610$   $\nu_2 = 40.95$
$r_4 = \infty$
  $d_4 = 1.0000$
$r_5 = \infty$ (stop)
  $d_5 = 0.0000$
$r_6 = 18.2502$
  $d_6 = 2.2548$   $n_3 = 1.68893$   $\nu_3 = 31.08$
$r_7 = -9.1197$
  $d_7 = 0.2000$
$r_8 = 7.2655$
  $d_8 = 2.8240$   $n_4 = 1.51633$   $\nu_4 = 64.15$
$r_9 = -6.4272$
  $d_9 = 2.5415$   $n_5 = 1.80518$   $\nu_5 = 25.43$
$r_{10} = 5.9255$
  $d_{10} = 1.7694$
$r_{11} = 20.6717$
  $d_{11} = 2.2502$   $n_6 = 1.69680$   $\nu_6 = 55.52$
$r_{12} = -8.2429$
  $d_{12} = 4.6099$
$r_{13} = \infty$
  $d_{13} = 4.5300$   $n_7 = 1.54771$   $\nu_7 = 62.83$
$r_{14} = \infty$
  $d_{14} = 0.8000$   $n_8 = 1.52420$   $\nu_8 = 70.20$
$r_{15} = \infty$
f/D = 0.83

Embodiment 3

$f = 7$ mm, image height = 4.2 mm, $2\omega = 62°$, F/8, S = 1 mm
$r_1 = 28.8168$ (aspherical surface)
  $d_1 = 1.0000$   $n_1 = 1.51633$   $\nu_1 = 64.15$
$r_2 = 4.1347$
  $d_2 = 2.8584$
$r_3 = \infty$
  $d_3 = 6.7200$   $n_2 = 1.80610$   $\nu_2 = 40.95$
$r_4 = \infty$
  $d_4 = 1.0000$
$r_5 = \infty$ (stop)
  $d_5 = 0.0000$
$r_6 = 15.9442$
  $d_6 = 2.4666$   $n_3 = 1.63980$   $\nu_3 = 34.48$
$r_7 = -8.1751$
  $d_7 = 0.2000$
$r_8 = 8.0000$
  $d_8 = 2.8402$   $n_4 = 1.51633$   $\nu_4 = 64.15$
$r_9 = -7.0862$
  $d_9 = 2.5217$   $n_5 = 1.80518$   $\nu_5 = 25.43$
$r_{10} = 5.4391$
  $d_{10} = 1.7398$
$r_{11} = 22.0675$
  $d_{11} = 2.5000$   $n_6 = 1.69680$   $\nu_6 = 55.52$
$r_{12} = -7.1943$
  $d_{12} = 3.2349$
$r_{13} = \infty$
  $d_{13} = 4.5300$   $n_7 = 1.54771$   $\nu_7 = 62.83$
$r_{14} = \infty$
  $d_{14} = 0.8000$   $n_8 = 1.52420$   $\nu_8 = 70.20$
$r_{15} = \infty$
aspherical surface coeficients
P = 1.0000
E = $0.23491 \times 10^{-3}$
F = $-0.14307 \times 10^{-4}$
G = $0.10341 \times 10^{-5}$
f/D = 0.83

Embodiment 4

$f = 7$ mm, image height = 4.2 mm, $2\omega = 62°$ F/4, S = 1 mm
$r_1 = 10.2417$
  $d_1 = 1.0000$   $n_1 = 1.77250$   $\nu_1 = 49.66$
$r_2 = 3.3641$
  $d_2 = 1.2000$
$r_3 = \infty$
  $d_3 = 6.7000$   $n_2 = 1.80610$   $\nu_2 = 40.95$
$r_4 = \infty$ (stop)
  $d_4 = 0.5371$
$r_5 = -69.9680$
  $d_5 = 4.3065$   $n_3 = 1.51633$   $\nu_3 = 64.15$
$r_6 = -6.2235$
  $d_6 = 2.7619$
$r_7 = 13.5946$
  $d_7 = 3.0000$   $n_4 = 1.51633$   $\nu_4 = 64.15$
$r_8 = -19.1745$
  $d_8 = 0.2000$
$r_9 = 33.1266$
  $d_9 = 4.0000$   $n_5 = 1.51633$   $\nu_5 = 64.15$
$r_{10} = -7.1296$
  $d_{10} = 1.5000$   $n_6 = 1.80518$   $\nu_6 = 25.43$
$r_{11} = -78.1103$
  $d_{11} = 2.6200$
$r_{12} = \infty$
  $d_{12} = 1.6000$   $n_7 = 1.51633$   $\nu_7 = 64.15$
$r_{13} = \infty$
  $d_{13} = 4.4000$   $n_8 = 1.54771$   $\nu_8 = 62.83$
$r_{14} = \infty$
  $d_{14} = 0.6000$ $r_{15} = \infty$
$r_{16} = \infty$
f/D = 0.83

Embodiment 5 f = 7 mm, image height = 4.2 mm, 2ω = 62°, F/4, S = 1 mm

| | | | |
|---|---|---|---|
| $r_1 = 7.0174$ (aspherical surface) | | | |
| | $d_1 = 1.0000$ | $n_1 = 1.51633$ | $v_1 = 64.15$ |
| $r_2 = 2.6323$ | | | |
| | $d_2 = 1.2006$ | | |
| $r_3 = \infty$ | | | |
| | $d_3 = 6.7000$ | $n_2 = 1.80610$ | $v_2 = 40.95$ |
| $r_4 = \infty$ (stop) | | | |
| | $d_4 = 0.5500$ | | |
| $r_5 = -28.1871$ | | | |
| | $d_5 = 4.3298$ | $n_3 = 1.51633$ | $v_3 = 64.15$ |
| $r_6 = -6.0338$ | | | |
| | $d_6 = 2.7713$ | | |
| $r_7 = 30.2102$ | | | |
| | $d_7 = 3.0000$ | $n_4 = 1.51633$ | $v_4 = 64.15$ |
| $r_8 = -12.7211$ | | | |
| | $d_8 = 0.2000$ | | |
| $r_9 = 26.8942$ | | | |
| | $d_9 = 4.0000$ | $n_5 = 1.51633$ | $v_5 = 64.15$ |
| $r_{10} = -6.6346$ | | | |
| | $d_{10} = 1.5000$ | $n_6 = 1.80518$ | $v_6 = 25.43$ |
| $r_{11} = -28.4755$ | | | |
| | $d_{11} = 2.2170$ | | |
| $r_{12} = \infty$ | | | |
| | $d_{12} = 1.6000$ | $n_7 = 1.51633$ | $v_7 = 64.15$ |
| $r_{13} = \infty$ | | | |
| | $d_{13} = 4.4000$ | $n_8 = 1.54771$ | $v_8 = 62.83$ |
| $r_{14} = \infty$ | | | |
| | $d_{14} = 0.6000$ | | |
| $r_{15} = \infty$ | | | |
| | $d_{15} = 1.3100$ | $n_9 = 1.48749$ | $v_9 = 70.20$ |
| $r_{16} = \infty$ | | | | aspherical surface coefficients
P = 1.0000
E = 0.11857 × 10⁻²
F = 0.27076 × 10⁻⁴
G = 0.10215 × 10⁻⁵
f/D = 0.83

Embodiment 6 f = 7 mm, image height = 4.2 mm, 2ω = 62°, F/5.6, S = 1 mm

| | | | |
|---|---|---|---|
| $r_1 = 10.1431$ | | | |
| | $d_1 = 1.0000$ | $n_1 = 1.69680$ | $v_1 = 55.52$ |
| $r_2 = 3.2041$ | | | |
| | $d_2 = 1.2000$ | | |
| $r_3 = \infty$ | | | |
| | $d_3 = 6.7000$ | $n_2 = 1.80610$ | $v_2 = 40.95$ |
| $r_4 = \infty$ | | | |
| | $d_4 = 0.2000$ | | |
| $r_5 = \infty$ (stop) | | | |
| | $d_5 = 0.5380$ | | |
| $r_6 = -31.7676$ | | | |
| | $d_6 = 4.3104$ | $n_3 = 1.69680$ | $v_3 = 55.52$ |
| $r_7 = -6.6614$ | | | |
| | $d_7 = 2.7256$ | | |
| $r_8 = 14.1829$ | | | |
| | $d_8 = 3.9936$ | $n_4 = 1.49700$ | $v_4 = 81.61$ |
| $r_9 = -6.7283$ | | | |
| | $d_9 = 1.4879$ | $n_5 = 1.84666$ | $v_5 = 23.78$ |
| $r_{10} = -13.2892$ | | | |
| | $d_{10} = 5.5330$ | | |
| $r_{11} = \infty$ | | | |
| | $d_{11} = 1.6000$ | $n_6 = 1.51633$ | $v_6 = 64.15$ |
| $r_{12} = \infty$ | | | |
| | $d_{12} = 4.4000$ | $n_7 = 1.54771$ | $v_7 = 62.83$ |
| $r_{13} = \infty$ | | | |
| | $d_{13} = 0.6000$ | | |
| $r_{14} = \infty$ | | | |
| | $d_{14} = 1.3100$ | $n_8 = 1.48749$ | $v_8 = 70.20$ |
| $r_{15} = \infty$ | | | | f/D = 0.83

Embodiment 7 f = 7 mm, image height = 4.2 mm, 2ω = 62°, F/8, S = 1 mm

| | | | |
|---|---|---|---|
| $r_1 = 7.7055$ | | | |
| | $d_1 = 1.0000$ | $n_1 = 1.53172$ | $v_1 = 48.90$ |
| $r_2 = 2.6299$ (aspherical surface) | | | |
| | $d_2 = 1.2000$ | | |
| $r_3 = \infty$ | | | |
| | $d_3 = 6.7000$ | $n_2 = 1.80610$ | $v_2 = 40.95$ |
| $r_4 = \infty$ | | | |
| | $d_4 = 0.2000$ | | |
| $r_5 = \infty$ (stop) | | | |
| | $d_5 = 0.6675$ | | |
| $r_6 = 18.3361$ | | | |
| | $d_6 = 4.5751$ | $n_3 = 1.69680$ | $v_3 = 55.52$ |
| $r_7 = -7.9655$ | | | |
| | $d_7 = 3.2547$ | | |
| $r_8 = 24.5187$ | | | |
| | $d_8 = 4.8727$ | $n_4 = 1.51633$ | $v_4 = 64.15$ |
| $r_9 = -4.1973$ | | | |
| | $d_9 = 1.0148$ | $n_5 = 1.80518$ | $v_5 = 25.43$ |
| $r_{10} = -9.8875$ | | | |
| | $d_{10} = 1.0000$ | | |
| $r_{11} = \infty$ | | | |
| | $d_{11} = 1.6000$ | $n_6 = 1.51633$ | $v_6 = 64.15$ |
| $r_{12} = \infty$ | | | |
| | $d_{12} = 4.4000$ | $n_7 = 1.54771$ | $v_7 = 62.83$ |
| $r_{13} = \infty$ | | | |
| | $d_{13} = 0.6000$ | | |
| $r_{14} = \infty$ | | | |
| | $d_{14} = 1.3100$ | $n_8 = 1.48749$ | $v_8 = 70.20$ |
| $r_{15} = \infty$ | | | | aspherical surface coefficients
P = 1.0000
E = −0.26402 × 10⁻²
F = 0.26150 × 10⁻³
G = −0.14781 × 10⁻³
f/D = 0.83

Embodiment 8 f = 7 mm, image height = 4.2 mm, 2ω = 62°, F/8, S = 1 mm

| | | | |
|---|---|---|---|
| $r_1 = 18.6732$ | | | |
| | $d_1 = 1.0000$ | $n_1 = 1.48749$ | $v_1 = 70.20$ |
| $r_2 = 3.7831$ (aspherical surface) | | | |
| | $d_2 = 9.5367$ | | |
| $r_3 = \infty$ (stop) | | | |
| | $d_3 = 0.7164$ | | |
| $r_4 = 5.0314$ | | | |
| | $d_4 = 2.4019$ | $n_2 = 1.84666$ | $v_2 = 23.78$ |
| $r_5 = 2.7656$ | | | |
| | $d_5 = 3.6106$ | $n_3 = 1.48749$ | $v_3 = 70.20$ |
| $r_6 = -6.4383$ | | | |
| | $d_6 = 7.1787$ | | |
| $r_7 = \infty$ | | | |
| | $d_7 = 4.5300$ | $n_4 = 1.54771$ | $v_4 = 62.83$ |
| $r_8 = \infty$ | | | |
| | $d_8 = 0.8000$ | $n_5 = 1.52420$ | $v_5 = 70.20$ |
| $r_9 = \infty$ | | | | aspherical surface coefficients
P = 1.0000, E = −0.99376 × 10⁻³,
F = 0.11082 × 10⁻⁴, G = −0.10100 × 10⁻⁴
$v_1 = 70.2$, $v_{2p} - v_{2n} = 46.42$
$(n_{2n} - n_{2p}) \times \{2/(|r_{2n}| + |r_{2p}|)\} \times f = 0.698$
$f_1/f = -1.42$, $f_2/f = 1.26$, f/D = 0.83

Embodiment 9 f = 7 mm, image height = 4.2 mm, 2ω = 62°, F/8, S = 1 mm

| | | | |
|---|---|---|---|
| $r_1 = 7.6583$ (aspherical surface) | | | |
| | $d_1 = 1.1242$ | $n_1 = 1.48749$ | $v_1 = 70.20$ |
| $r_2 = 3.3410$ | | | |
| | $d_2 = 3.3199$ | | |
| $r_3 = \infty$ | | | |
| | $d_3 = 6.8000$ | $n_2 = 1.51633$ | $v_2 = 64.15$ |
| $r_4 = \infty$ | | | |
| | $d_4 = 1.0000$ | | |
| $r_5 = \infty$ (stop) | | | |
| | $d_5 = 0.6968$ | | |
| $r_6 = 6.1028$ | | | |
| | $d_6 = 2.6923$ | $n_3 = 1.80518$ | $v_3 = 25.43$ |

$r_7 = 2.2505$
$r_8 = -6.7210$ (aspherical surface)
   $d_7 = 2.4463$   $n_4 = 1.60342$   $\nu_4 = 38.01$
   $d_8 = 5.5492$
$r_9 = \infty$
   $d_9 = 4.5300$   $n_5 = 1.54771$   $\nu_5 = 62.83$
$r_{10} = \infty$
   $d_{10} = 0.8000$   $n_6 = 1.52420$   $\nu_6 = 70.20$
$r_{11} = \infty$
aspherical surface coefficients
(1st surface)  $P = 1.0000, E = 0.57683 \times 10^{-3}$
   $F = 0.13353 \times 10^{-4}, G = 0.61032 \times 10^{-6}$
(8th surface)  $P = 1.0000, E = -0.76010 \times 10^{-3}$,
   $F = -0.19291 \times 10^{-3}, G = -0.51452 \times 10^{-4}$
$\nu_1 = 70.2, \nu_{2p} - \nu_{2n} = 12.58$
$(n_2 - n_{2p}) \times \{2/(|r_{2n}| + |r_{2p}|)\} \times f = 0.730$
$f_1/f = -1.90, f_2/f = 1.15, f/D = 0.83$ Embodiment 10

$f = 7$ mm, image height = 4.2 mm, $2\omega = 62°$, F/8, S = 1 mm
$r_1 = 16.4159$
   $d_1 = 1.0000$   $n_1 = 1.54814$   $\nu_1 = 45.78$
$r_2 = 5.4595$
   $d_2 = 7.5840$
$r_3 = \infty$
   $d_3 = 6.7200$   $n_2 = 1.80610$   $\nu_2 = 40.95$
$r_4 = \infty$
   $d_4 = 1.0000$
$r_5 = \infty$ (stop)
   $d_5 = 0.3187$
$r_6 = 4.1585$
   $d_6 = 1.8069$   $n_3 = 1.84666$   $\nu_3 = 23.78$
$r_7 = 2.3370$
   $d_7 = 1.9711$   $n_4 = 1.51633$   $\nu_4 = 64.15$
$r_8 = -13.2147$
   $d_8 = 5.2588$
$r_9 = \infty$
   $d_9 = 4.5300$   $n_5 = 1.54771$   $\nu_5 = 62.83$
$r_{10} = \infty$
   $d_{10} = 0.8000$   $n_6 = 1.52420$   $\nu_6 = 70.20$
$r_{11} = \infty$
$\nu_1 = 45.78, \nu_{2p} - \nu_{2n} = 40.37$
$(n_{2n} - n_{2p}) \times \{2/(|r_{2n}| + |r_{2p}|)\} \times f = 0.799$
$f_1/f = -2.20, f_2/f = 1.22, f/D = 0.83$ Embodiment 11

$f = 7$ mm, image height = 4.2 mm, $2\omega = 62°$, F/5.6, S = 1 mm
$r_1 = 12.6075$ (aspherical surface)
   $d_1 = 0.9327$   $n_1 = 1.487949$   $\nu_1 = 70.20$
$r_2 = 3.2614$
   $d_2 = 3.4950$
$r_3 = \infty$
   $d_3 = 6.7200$   $n_2 = 1.51633$   $\nu_2 = 64.15$
$r_4 = \infty$
   $d_4 = 1.0000$
$r_5 = \infty$ (stop)
   $d_5 = 1.3995$
$r_6 = 5.6433$
   $d_6 = 2.0240$   $n_3 = 1.80518$   $\nu_3 = 25.43$
$r_7 = 3.0491$
   $d_7 = 2.5272$   $n_4 = 1.48749$   $\nu_4 = 70.20$
$r_8 = -6.1979$ (aspherical surface)
   $d_8 = 8.6927$
$r_9 = \infty$
   $d_9 = 4.5300$   $n_5 = 1.54771$   $\nu_5 = 62.83$
$r_{10} = \infty$
   $d_{10} = 0.8000$   $n_6 = 1.52420$   $\nu_6 = 70.20$
$r_{11} = \infty$
aspherical surface coefficients
(1st surface)  $P = 1.0000, E = 0.95419 \times 10^{-3}$,
   $F = 0.46297 \times 10^{-5}, G = 0.40011 \times 10^{-6}$
(8th surface)  $P = 1.0000, E = 0.16170 \times 10^{-3}$,
   $F = -0.28453 \times 10^{-4}, G = -0.69306 \times 10^{-5}$
$\nu_1 = 70.2, \nu_{2p} - \nu_{2n} = 44.77$
$(n_{2n} - n_{2p}) \times \{2/(|r_{2n}| + |r_{2p}|)\} \times f = 0.729$
$f_1/f = -1.33, f_2/f = 1.26, f/D = 0.83$ Embodiment 12

$f = 7$ mm, image height = 4.2 mm, $2\omega = 62°$, F/8, S = 1 mm
$r_1 = 16.4817$
   $d_1 = 1.0000$   $n_1 = 1.48749$   $\nu_1 = 70.20$
$r_2 = 5.9725$
   $d_2 = 9.6315$
$r_3 = \infty$
   $d_3 = 7.0000$   $n_2 = 1.51633$   $\nu_2 = 64.15$
$r_4 = \infty$
   $d_4 = 1.0000$
$r_5 = \infty$ (stop)
   $d_5 = 0.1000$
$r_6 = 3.5922$
   $d_6 = 1.8015$   $n_3 = 1.84666$   $\nu_3 = 23.78$
$r_7 = 2.5625$
   $d_7 = 0.4860$
$r_8 = 3.7333$
   $d_8 = 2.0000$   $n_4 = 1.48749$   $\nu_4 = 70.20$
$r_9 = -12.1472$
   $d_9 = 4.8432$
$r_{10} = \infty$
   $d_{10} = 4.5300$   $n_5 = 1.54771$   $\nu_5 = 62.83$
$r_{11} = \infty$
   $d_{11} = 0.8000$   $n_6 = 1.52420$   $\nu_6 = 70.20$
$r_{12} = \infty$
$\nu_1 = 70.2, \nu_{2p} - \nu_{2n} = 46.42$
$(n_{2n} - n_{2p}) \times \{2/(|r_{2n}| + |r_{2p}|)\} \times f = 0.989$
$f_1/f = -2.83, f_2/f = 1.30, f/D = 0.83$ Embodiment 13

$f = 7$ mm, image height = 4.2 mm $2\omega = 62°$, F/8, S = 1 mm
$r_1 = 7.4617$ (aspherical surface)
   $d_1 = 1.0000$   $n_1 = 1.48749$   $\nu_1 = 70.20$
$r_2 = 3.3305$
   $d_2 = 3.1641$
$r_3 = \infty$
   $d_3 = 7.0000$   $n_2 = 1.51633$   $\nu_2 = 64.15$
$r_4 = \infty$
   $d_4 = 1.0000$
$r_5 = \infty$ (stop)
   $d_5 = 2.4335$
$r_6 = 13.5521$
   $d_6 = 3.5000$   $n_3 = 1.51633$   $\nu_3 = 64.15$
$r_7 = -2.7701$
   $d_7 = 0.6254$   $n_4 = 1.80518$   $\nu_4 = 25.43$
$r_8 = -4.4712$
   $d_8 = 8.6714$
$r_9 = \infty$
   $d_9 = 4.5300$   $n_5 = 1.54771$   $\nu_5 = 62.83$
$r_{10} = \infty$
   $d_{10} = 0.8000$   $n_6 = 1.52420$   $\nu_6 = 70.20$
$r_{11} = \infty$
aspherical surface coefficients
$P = 1.0000, E = 0.48566 \times 10^{-3}$,
$F = -0.84231 \times 10^{-7}, G = 0.12811 \times 10^{-5}$
$\nu_1 = 70.2, \nu_{2p} - \nu_{2n} = 38.72$
$(n_{2n} - n_{2p}) \times \{2/(|r_{2n}| + |r_{2p}|)\} \times f = 0.628$
$f_1/f = -1.92, f_2/f = 1.29, f/D = 0.83$ Embodiment 14

$f = 7$ mm, image height = 4.2 mm, $2\omega = 62°$, F/8, S = 1 mm
$r_1 = 9.4874$ (aspherical surface)
   $d_1 = 1.0000$   $n_1 = 1.48749$   $\nu_1 = 70.20$
$r_2 = 2.8677$
   $d_2 = 3.1490$
$r_3 = \infty$
   $d_3 = 6.7200$   $n_2 = 1.80610$   $\nu_2 = 40.95$
$r_4 = \infty$
   $d_4 = 1.0000$
$r_5 = \infty$ (stop)
   $d_5 = 2.3182$
$r_6 = 6.7454$
   $d_6 = 3.5000$   $n_3 = 1.48749$   $\nu_3 = 70.20$
$r_7 = -3.4453$
   $d_7 = 0.5245$
$r_8 = -2.9242$
   $d_8 = 0.6567$   $n_4 = 1.80518$   $\nu_4 = 25.43$
$r_9 = -4.7291$
   $d_9 = 8.9583$ -continued $r_{10} = \infty$
$d_{10} = 4.5300$ $n_5 = 1.54771$ $v_5 = 62.83$
$r_{11} = \infty$
$d_{11} = 0.8000$ $n_6 = 1.52420$ $v_6 = 70.20$
$r_{12} = \infty$
aspherical surface coefficients
p = 1.0000, E = 0.11449 × 10$^{-2}$,
F = 0.12297 × 10$^{-4}$, G = 0.12531 × 10$^{-5}$
$v_1 = 70.2$, $v_{2p} - v_{2n} = 44.77$
$(n_{2n} - n_{2p}) \times \{2/(|r_{2n}| + |r_{2p}|)\} \times f = 0.909$
$f_1/f = -1.27$, $f_2/f = 1.26$, f/D = 0.83 wherein the reference symbols $r_1$, $r_2$, . . . represent radii of curvature on surfaces of the respective lens elements, the reference symbols $d_1$, $d_2$, . . . designate thicknesses of the respective lens elements and airspaces reserved therebetween, the reference symbols $n_1$, $n_2$, . . . denote refractive indices of the respective lens elements, the reference symbols $v_1$, $v_2$, . . . represent Abbe's numbers of the respective lens elements, and the reference symbols S designates a distance between the last lens surface of the lens system and the image surface.

The first embodiment of the optical system according to the present invention has a composition illustrated in FIG. 5, wherein a photographic lens system consists of a front lens unit (or assembly) composed of two lens components of two lens elements, i.e., a negative meniscus lens element having a convex surface on the object side and a biconcave lens element which are disposed on the object side of a prism ($r_5$, $r_6$), and a rear lens unit (or assembly) composed of three lens components of four lens elements, i.e., a biconvex lens component, a cemented doublet consisting of a biconvex lens element and a biconcave lens element, and a biconvex lens component which are disposed on the image side of the prism.

The second embodiment and the third embodiment have compositions illustrated in FIG. 6 and FIG. 7 respectively. Each of these embodiments consists of a front lens unit (or assembly) composed of a single lens component of a single lens element having a convex surface on the object side which is disposed on the object side of a prism ($r_3$, $r_4$), and a rear lens unit (or assembly) composed of three lens components of four lens elements, i.e., a biconvex lens component, a cemented doublet consisting of a biconvex lens element and a biconcave lens element, and a biconvex lens component which are disposed on the image side of the prism.

Figure 9:
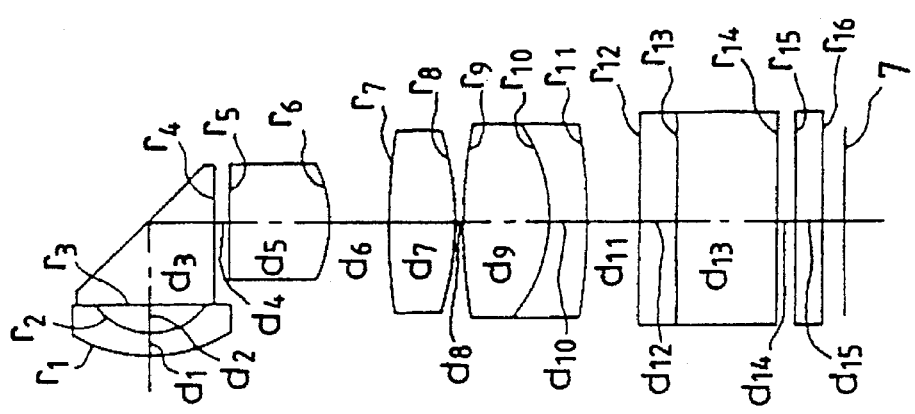
Figure 8:
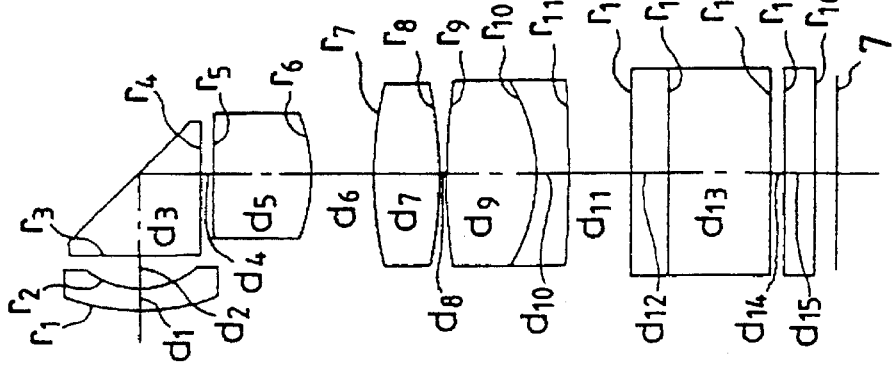

The fourth embodiment and the fifth embodiment have compositions illustrated in FIG. 8 and FIG. 9 respectively. Each of these embodiment consists of a front lens unit composed of a single lens component of a single lens element having a convex surface on the object side which is disposed on the object side of a prism ($r_3$, $r_4$), and a rear lens unit composed of three lens components of four lens elements, i.e., a positive meniscus lens component having a convex surface on the image side, a biconvex lens component and a cemented doublet consisting of a biconvex lens element and a negative meniscue lens element having a convex surface on the image side which are disposed on the image side of the prism.

Figure 10:
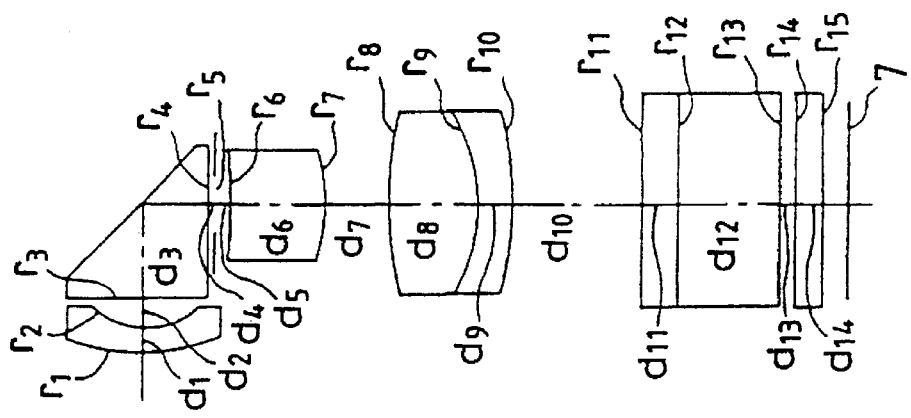

The sixth embodiment of the present invention has a composition illustrated in FIG. 10, wherein the photographic lens system consists of a front lens unit composed of a single lens component of a single negative lens element having a convex surface on the object side which is disposed on the object side of a prism ($r_3$, $r_4$), and a rear lens unit composed of two lens components of three lens elements i.e., a positive meniscus lens component having a convex surface on the image side, and a cemented doublet consisting of a biconvex lens element and a negative meniscus lens element having a convex surface on the image side which are disposed on the image side of the prism.

Figure 11:
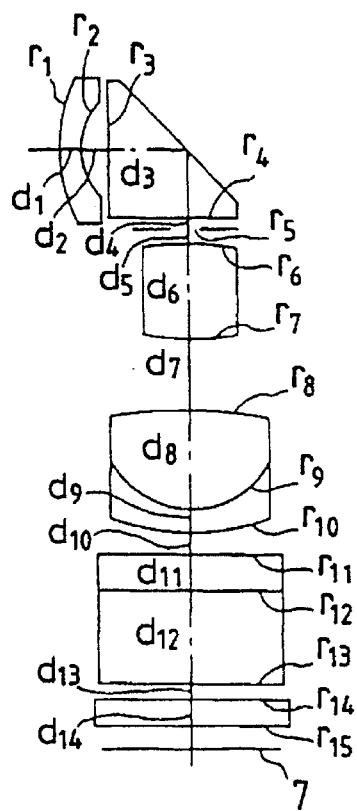
Figure 12:
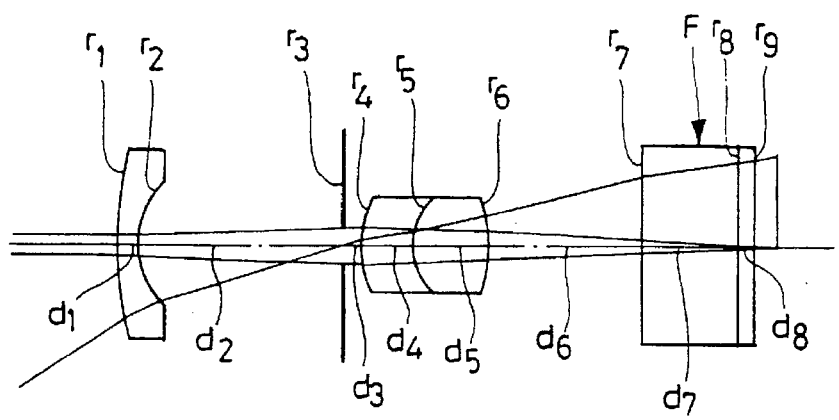
Figure 13:
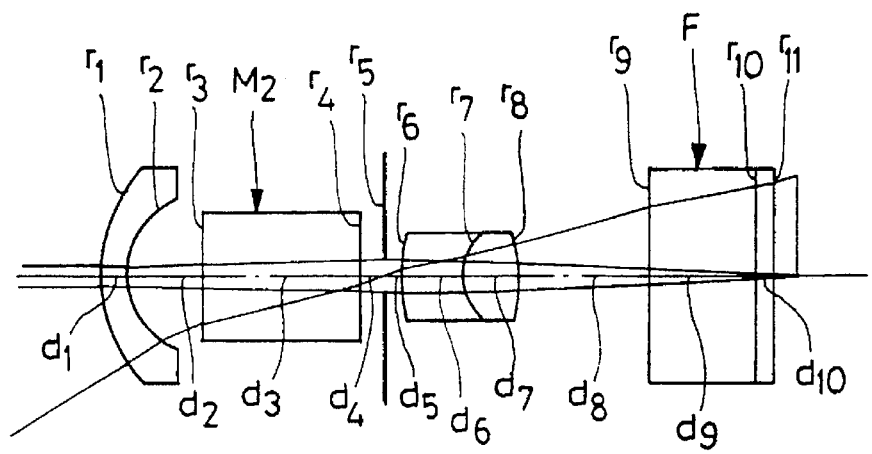
Figure 14:
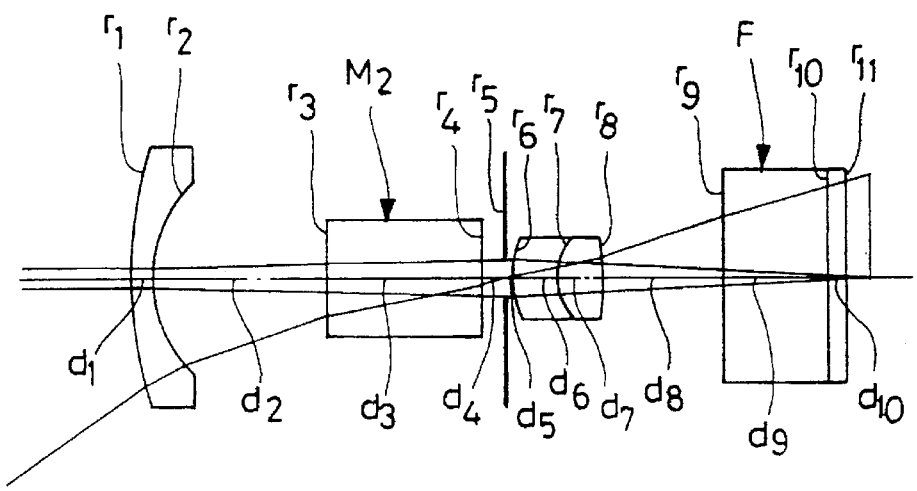
Figure 15:
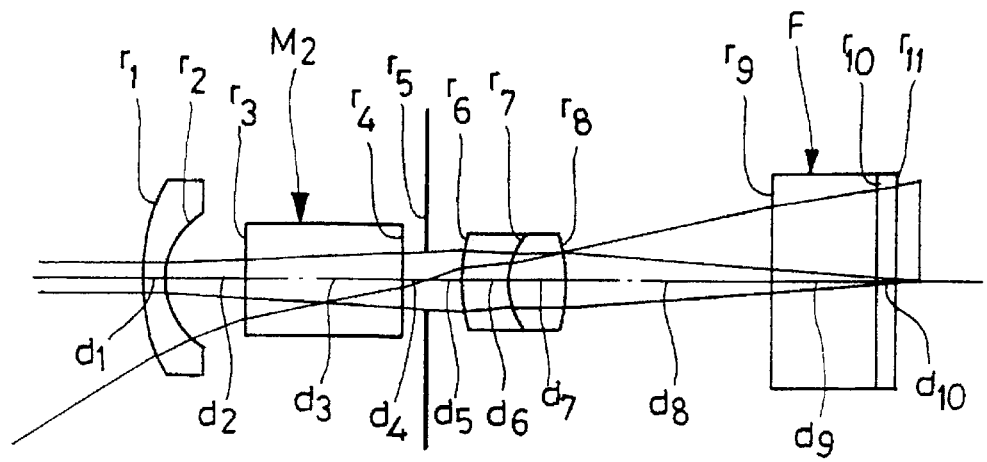

The seventh embodiment has a composition illustrated in FIG. 11, wherein the photographic lens system consists of a front lens unit composed of a single lens component of a single lens element which is disposed on the object side of a prism ($r_3$, $r_4$), and a rear lens unit composed of two lens components of three lens elements, i.e., a biconvex lens component, and a cemented doublet consisting of a biconvex lens element and a negative meniscus lens element having a convex surface on the image side which are disposed on the image side of the prism.

The eighth through fourteenth embodiments of the present invention have compositions illustrated in FIG. 12 through FIG. 18 respectively. Each of these embodiments consists of a first positive lens component of a single lens element, and a second lens component which is composed of a negative lens element and a positive lens element.

In each of the eighth through eleventh embodiment of the present invention which have compositions illustrated in FIG. 12 through FIG. 15 respectively, the first lens component is configured as a negative meniscus lens component having a convex surface on the object side, whereas the second lens component is configured as a cemented doublet consisting of a negative meniscus lens element having a convex surface on the object side and a biconvex lens element.

Figure 16:
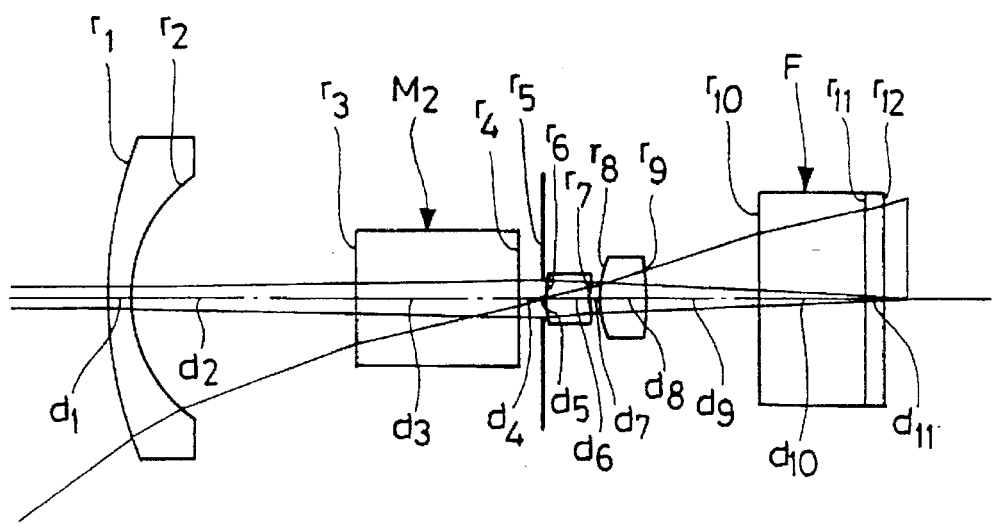

In the twelfth embodiment having the composition illustrated in FIG. 16, the first lens component is configured as a negative meniscus lens component having a convex surface on the object side, whereas the second lens component consists of a negative meniscus lens element having a convex surface on the object side and a positive meniscus lens element having a convex surface on the object side, these two lens elements being separated from each other with a narrow airspace reserved therebetween.

Figure 17:
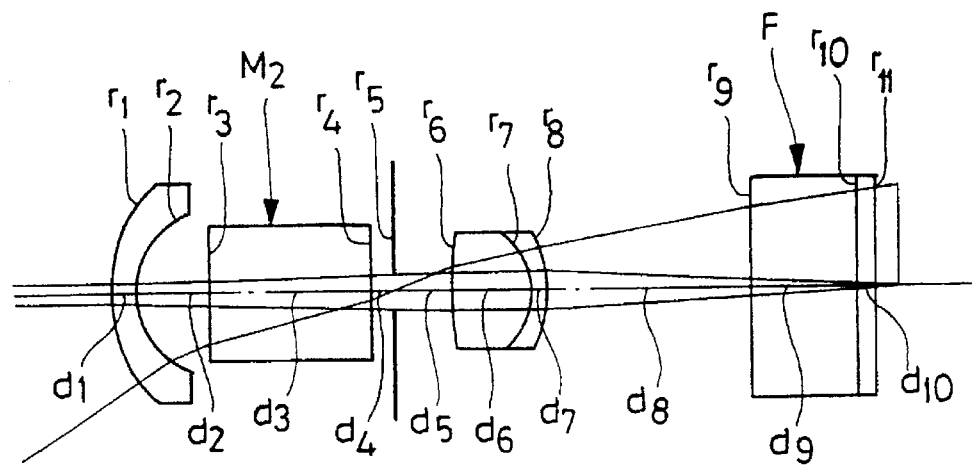

The thirteenth embodiment of the present invention has the composition illustrated in FIG. 17, wherein the first lens component is configured as a negative meniscus lens element having a convex surface on the object side, whereas the second lens component is configured as a cemented doublet consisting of a biconvex lens element and a negative meniscus lens element having a concave surface on the object side.

Figure 18:
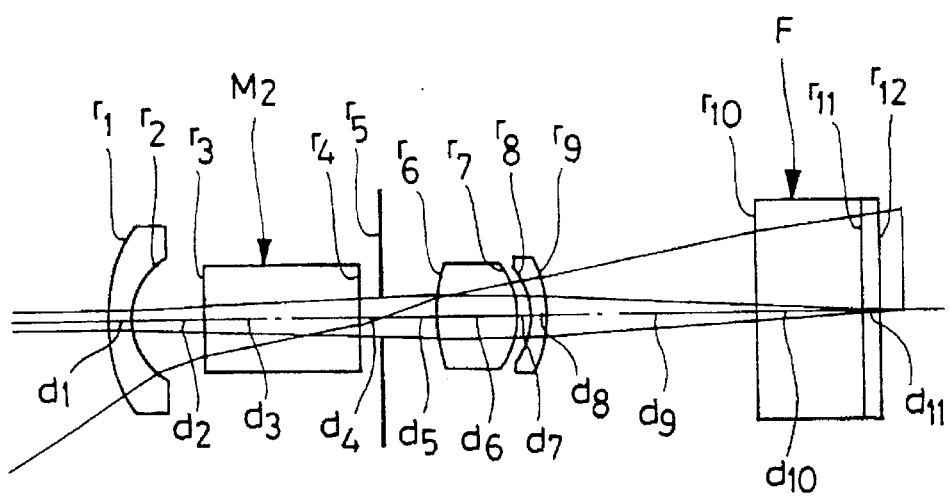
Figure 23A:
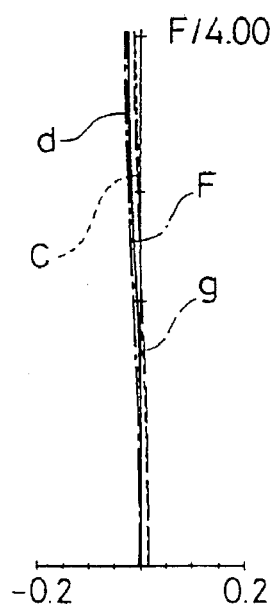
Figure 23B:
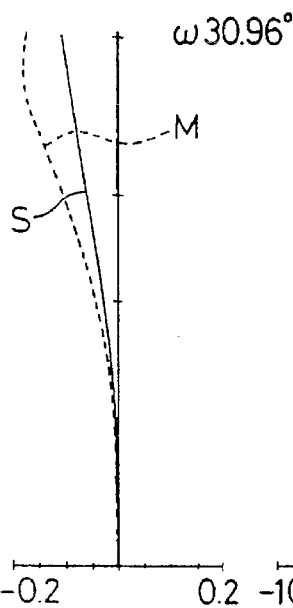
Figure 23C:
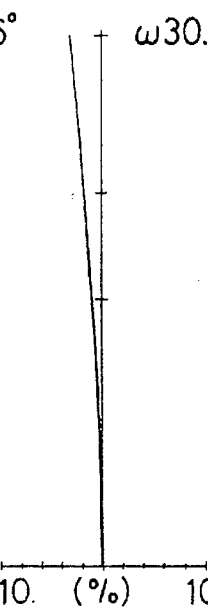
Figure 23D:
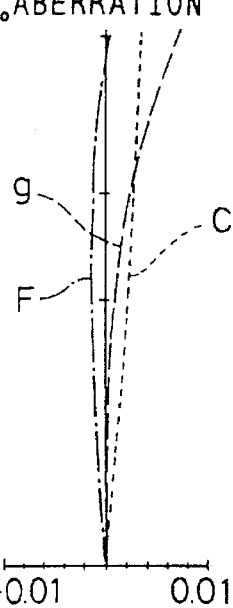
Figure 24A:
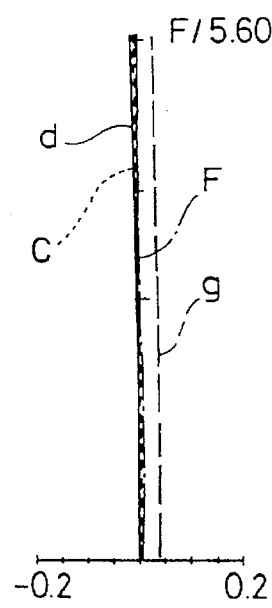
Figure 24B:
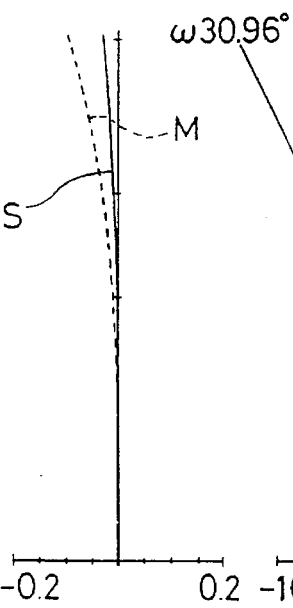
Figure 24C:
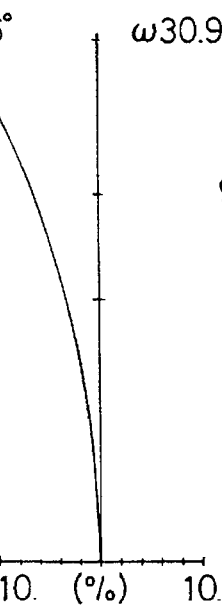
Figure 24D:
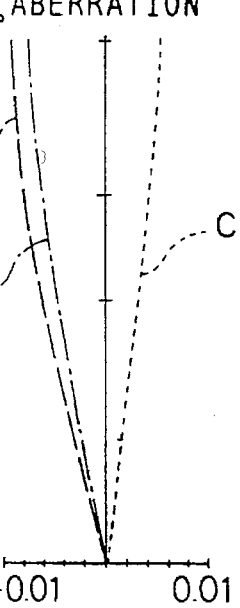

In the fourteenth embodiment of the present invention having a composition illustrated in FIG. 18, the first lens component is configured as a negative meniscus lens element having a convex surface on the object side, whereas the second lens component consists of a biconvex lens element and a negative meniscus lens element having a concave surface on the object side, these two lens elements being separated from each other with a narrow airspace reserved therebetween.

Figure 33:
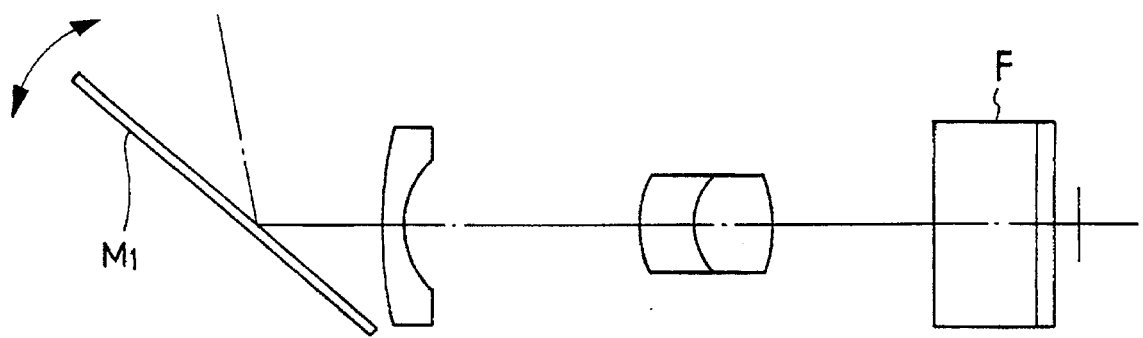
FIG. 33 through FIG. 35 show sectional views exemplifying disposition of a reflecting member and other compositions for deflecting an optical axis of the optical system for automobile-mounted monitor cameras according to the present invention.
Figure 34:
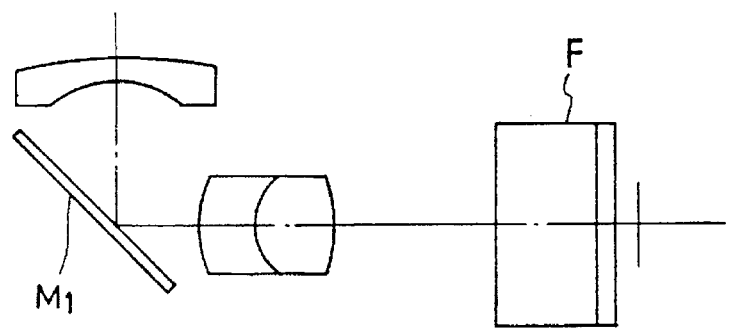
Figure 35:
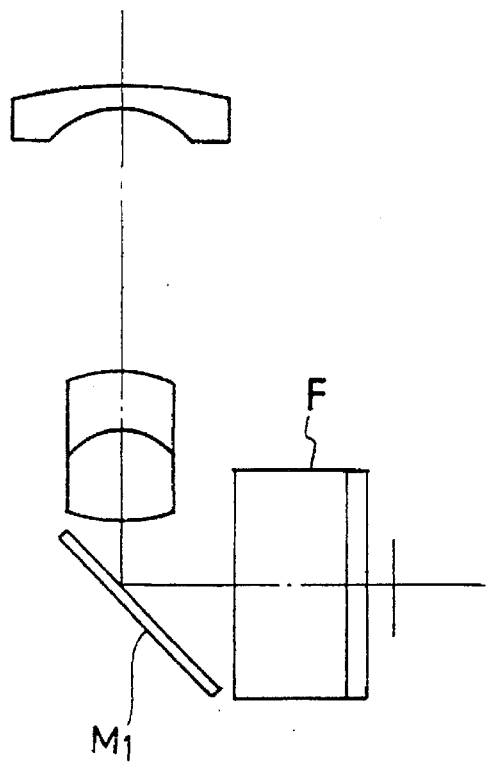

Though the eighth embodiment is designed for observation within a visual field located in front of an automobile, this embodiment can be modified for observation within a sideway visual field by disposing a reflecting mirror $M_1$ on the object side of the first lens component ($r_1$, $r_2$) as shown in FIG. 33 or disposing the reflecting mirror $M_1$ (or a prism) between the first lens component and the second lens component as illustrated in FIG. 34. When the eighth embodiment is modified for observation within a sideway visual field as described above, the eighth embodiment is usable, like the other embodiments of the present invention, as a photographic lens system for an optical system for automobile-mounted monitor cameras shown in FIG. 4. Further, it is possible to dispose a reflecting mirror $M_2$ (or a prism) on the image side of the second lens component as shown in FIG. 35. In cases of the eighth through fourteenth embodiments of the present invention which have the compact compositions, in particular, monitor cameras cannot be so large even by disposing the prism or reflecting mirror at the location illustrated in FIG. 33 or FIG. 35 which is different from the location shown in FIG. 34.

Figure 36:
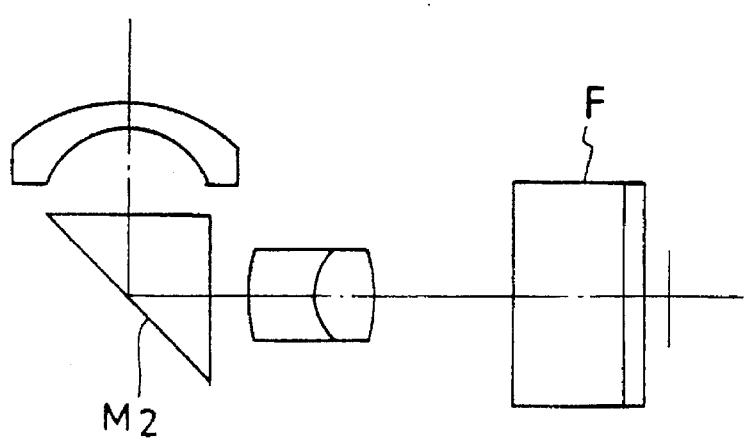
FIG. 36 shows a sectional view illustrating deflection of the optical axis by using a prism $M_2$ in the ninth through fourteenth embodiments of the present invention.

Moreover, the reference symbol $M_2$ used in FIG. 13 through FIG. 18 represents a prism such as that for deflecting an optical axis so as to permit sideway monitoring, for example, as illustrated in FIG. 36. The reference symbol F used in FIG. 12 through FIG. 18 designates a filter. By the way, usable as an optical member for deflecting an optical axis is a roof prism, a rectangular prism or a reflecting plate.

In addition, the aspherical surfaces to be used in the embodiments of the present invention described above have shapes which are expressed by the following formula:

$$x = \frac{y^2/r}{1+\sqrt{1-p(y/r)^2}} + Ey^4 + Fy^6 + Gy^8 + Hy^{10} + \ldots$$

wherein the reference symbol r represents a radius of curvature on a reference sphere of the aspherical surface, the reference symbol P designates a conical constant, and the reference symbols E, F, G, H, ... denote aspherical surface coefficients of the fourth, sixth, eighth, tenth, ... orders respectively.

As is understood from the foregoing description, the optical system according to the present invention can easily be accommodated and is advantageous for configuring automobile-mounted monitor cameras so as to be compact and hardly subjected to external impact. Further, the photographic lens system adopted for the optical system for automobile-mounted monitor cameras according to the present invention is compact, and has distortion, chromatic aberration and other aberrations which are corrected favorably.

I claim:

1. A photographic lens system comprising, in order from the object side: a first lens component having a negative refractive power and a second lens component having a positive refractive power; wherein said first lens component consists only of a single negative lens element, and said second lens component consists of a negative meniscus lens element and a biconvex lens element disposed in this order or the reverse order, and wherein said photographic lens system satisfies the following conditions (2), (3) and (4):

$$\nu_1 > 40 \quad (2)$$

$$\nu_{2p} - \nu_{2n} > 10 \quad (3)$$

$$(n_{2n} - n_{2p}) \times \{2/(|r_{2n}| + |r_{2p}|)\} \times f > 0.48 \quad (4)$$

wherein the reference symbol $\nu_1$ represents an Abbe's number of the negative lens element of said first lens component, the reference symbols $\nu_{2p}$ and $\nu_{2n}$ designate Abbe's numbers of the positive lens element and the negative lens element of said second lens component respectively, the reference symbols $n_{2p}$ and $n_{2n}$ represent refractive indices of the positive lens element and the negative lens element, respectively, of the second lens component, the reference symbols $r_{1p}$ and $[r_{2n}$ denote radii of curvature on surfaces of the positive lens element and the negative lens element respectively of said second lens component which are opposed to each other (a radius of curvature $r_{1p} = [r_{2n}$ on a cemented surface in a case where said second lens component is configured as a cemented doublet), and the reference symbol f represents a focal length of said photographic lens system as a whole.

2. An optical system for monitor cameras to be mounted on vehicles according to claim 1 satisfying the following conditions (5) and (6):

$$-4 < f_1/f < -0.95 \quad (5)$$

$$0.85 < f_2/f < 2 \quad (6)$$

wherein the reference symbols $f_1$ and $f_2$ represent focal lengths of said first lens component and said second lens component respectively, and the reference symbol f designates a focal length of said photographic lens system as a whole.

3. A photographic lens system according to claim 1 or 2 wherein said first lens component has an aspherical surface having a negative refractive power which is weakened as portions of said aspherical surface are farther from an optical axis thereof.

* * * * *